(12) United States Patent
Li et al.

(10) Patent No.: US 9,317,954 B2
(45) Date of Patent: Apr. 19, 2016

(54) REAL-TIME PERFORMANCE CAPTURE WITH ON-THE-FLY CORRECTIVES

(71) Applicant: LucasFilm Entertainment Company Ltd., San Francisco, CA (US)

(72) Inventors: Hao Li, Santa Monica, CA (US); Jihun Yu, Sausalito, CA (US); Yuting Ye, San Francisco, CA (US); Christoph Bregler, New York, NY (US)

(73) Assignee: LUCASFILM ENTERTAINMENT COMPANY LTD., San Francisco, CA (US)

(*) Notice: Subject to any disclaimer, the term of this patent is extended or adjusted under 35 U.S.C. 154(b) by 71 days.

(21) Appl. No.: 14/141,348

(22) Filed: Dec. 26, 2013

(65) Prior Publication Data
US 2015/0084950 A1    Mar. 26, 2015

(51) Int. Cl.
| | | |
|---|---|---|
| *G06T 15/00* | (2011.01) | |
| *G06T 13/40* | (2011.01) | |
| *G06T 7/20* | (2006.01) | |
| *G06K 9/00* | (2006.01) | |
| *G06K 9/62* | (2006.01) | |

(52) U.S. Cl.
CPC ............ *G06T 13/40* (2013.01); *G06K 9/00214* (2013.01); *G06K 9/00308* (2013.01); *G06K 9/6247* (2013.01); *G06T 7/2046* (2013.01); *G06T 2207/10016* (2013.01); *G06T 2207/10028* (2013.01); *G06T 2207/20076* (2013.01); *G06T 2207/30201* (2013.01)

(58) Field of Classification Search
CPC .................. G06K 9/00; G06T 7/2046; G06T 2207/10016; G06T 13/40; G06T 2207/20076; G06T 2207/30201; G06T 2207/10028

USPC .......................... 345/419, 473, 474, 475, 629
See application file for complete search history.

(56) References Cited

U.S. PATENT DOCUMENTS

| | | | | |
|---|---|---|---|---|
| 8,207,971 B1 * | 6/2012 | Koperwas et al. | ............ | 345/473 |
| 8,614,714 B1 * | 12/2013 | Koperwas et al. | ............ | 345/473 |
| 8,624,904 B1 * | 1/2014 | Koperwas et al. | ............ | 345/473 |

OTHER PUBLICATIONS

Li et al, Facial Motion capture Editing by Automated orthogonal Blendshape Construction and Weight Propagation, University of Houston, Technical Report No. UH-CS-07-12, Oct. 2007, pp. 1-10.*
Li et al, Orthogonal-Blendshape-based Editing System for Facial Motion capture Data, IEEE Computer Society, Nov. 2008, pp. 76-82.*

(Continued)

*Primary Examiner* — Phu K Nguyen
(74) *Attorney, Agent, or Firm* — Kilpatrick Townsend & Stockton LLP

(57) ABSTRACT

Techniques for facial performance capture using an adaptive model are provided herein. For example, a computer-implemented method may include obtaining a three-dimensional scan of a subject and a generating customized digital model including a set of blendshapes using the three-dimensional scan, each of one or more blendshapes of the set of blendshapes representing at least a portion of a characteristic of the subject. The method may further include receiving input data of the subject, the input data including video data and depth data, tracking body deformations of the subject by fitting the input data using one or more of the blendshapes of the set, and fitting a refined linear model onto the input data using one or more adaptive principal component analysis shapes.

20 Claims, 13 Drawing Sheets
(3 of 13 Drawing Sheet(s) Filed in Color)

(56) References Cited

OTHER PUBLICATIONS

Chiang et al, Video-Driven Creation of Virtual Avatars by Component-based Transferring of Facial Expressions, Journal of Information Science & Engineering. Nov. 2013, vol. 29 Issue 6, p. 1265-1283. 19p.*

Li et al, Realtime Facial Animation with On-the-fly Correctives, ACM Transactions on Graphics. Jul. 2013, vol. 32 Issue 4, pp. 1-9.*

Seol et al, Spacetime Expression Cloning for Blandshapes, ACM Trans. Graphics, Apr. 2012, pp. 14:1-14:12.*

Neumann et al, Sparse Localized Deformation Components, Transactions on Graphics. Nov. 2013, vol. 32 Issue 6, p. 1-10.*

Alexander, O. et al., "Creating a Photoreal Digital Actor: The Digital Emily Project," *ACM SIGGRAPH 2009 Course Notes*, Aug. 2009, pp. 1-15.

Beeler, T. et al., "High-Quality Passive Facial Performance Capture using Anchor Frames," *ACM Transactions on Graphics*, vol. 30, No. 4, Aug. 2011, pp. 75:1-10.

Bickel, B. et al., "Pose-Space Animation and Transfer of Facial Details," *Proceedings of the 2008 ACM SIGGRAPH/Eurographics Symposium on Computer Animation*, 2008, pp. 57-66.

Black, M. & Yacoob, Y., "Tracking and Recognizing Rigid and Non-Rigid Facial Motions using Local Parametric Models of Image Motion," *Proceedings of the Fifth International Conference on Computer Vision*, IEEE Computer Society, Washington, DC, USA, 1995, pp. 374-381.

Blanz, V. et al., "A Morphable Model for the Synthesis of 3D Faces," *Proceedings of ACM Siggraph 99*, ACM Press/Addison-Wesley Publishing Co., 1999, pp. 187-194.

Borshukov, G. et al., "Universal Capture—Image-based Facial Animation for 'The Matrix Reloaded,'" *ACM SIGGRAPH 2005 Courses*, 2005, 1 page.

Botsch, M. et al., "On Linear Variational Surface Deformation Methods," *IEEE Transactions on Visualization and Computer Graphics*, vol. 14, No. 1, Jan. 2008, pp. 213-230.

Bradley, D. et al., "High Resolution Passive Facial Performance Capture," *ACM Transactions on Graphics*, vol. 29, No. 4, Jul. 2010, pp. 41:1-10.

Bregler, C. & Omohundro, S.M., "Surface Learning with Applications to Lipreading," *Advances in Neural Information Processing Systems 6*, 1994, pp. 43-43.

Bregler, C. et al., "Video Rewrite: Driving Visual Speech with Audio," *Proceedings of Computer graphics and interactive techniques*, 1997, 8 pages.

Chai, J.-X. et al., "Vision-based Control of 3D Facial Animation," *Proceedings of the 2003 ACM SIGGRAPH/Eurographics symposium on Computer animation*, Eurographics Association, Aire-la-Ville, Switzerland, 2003, pp. 193-206.

Chandrasekaran, S. et al., "An Eigenspace Update Algorithm for Image Analysis," *CVGIP: Graphical Model and Image Processing*, vol. 59, No. 5, 1997, pp. 321-332.

Chuang, E. et al., "Performance Driven Facial Animation using Blendshape Interpolation," Tech. rep., Stanford University, 2002, 8 pages.

Collins, R. et al., "Online Selection of Discriminative Tracking Features," *IEEE Transactions on Pattern Analysis and Machine Intelligence*, vol. 27, No. 10, Oct. 2005, pp. 1631-1643.

Cootes, T. F. et al., "Active Appearance Models," *IEEE Transactions on Pattern Analysis and Machine Intelligence*, Springer, vol. 23, No. 6, 1998, pp. 484-498.

Covell, M. et al., "Eigen-Points," *Image Processing, 1996. Proceedings., International Conference on*, vol. 3, IEEE, 1996, pp. 471-474.

DeCarlo, D. et al., "Optical Flow Constraints on Deformable Models with Applications to Face Tracking," *International Journal of Computer Vision*, vol. 38, No. 2, Jul. 2000, pp. 99-127.

Dempster, A. et al., "Maximum Likelihood from Incomplete Data via the EM Algorithm," *Journal of the Royal Statistical Society. Series B (Methodological)*, 1977, pp. 1-38.

Ekman, P. et al., "*Facial Action Coding System: A Technique for the Measurement of Facial Movement*," Consulting Psychologists Press, Palo Alto, 1978, 48 pages.

Essa, I. et al., "Modeling, Tracking and Interactive Animation of Faces and Heads using Input from Video," *Proceedings of the Computer Animation*, IEEE Computer Society, CA, 1996, pp. 68-79.

Furukawa, Y. & Ponce, J., "Dense 3D Motion Capture for Human Faces," *2009 IEEE Computer Society Conference on Computer Vision and Pattern Recognition* (CVPR 2009), Jun. 20-25, 2009, Miami, Florida, USA, IEEE, pp. 1674-1681.

Fyffe, G. et al., "Comprehensive Facial Performance Capture," *Eurographics*, 2011, vol. 30, No. 2, 1 page.

Grabner, H. et al., "Semi-supervised On-Line Boosting for Robust Tracking." *Proceedings of the 10th European Conference on Computer Vision: Part I*, Springer-Verlag, Berlin, Heidelberg, ECCV, 2008, pp. 234-247.

Gu, M. & Eisenstat, S.C., "A Stable and Fast Algorithm for Updating the Singular Value Decomposition," Tech. Rep. YALEU/DCS/RR-966, Yale University, New Haven, CT, 1993, pp. 1-36.

Guenter, B. et al., "Making Faces," *Proceedings of SIGGRAPH, ACM*, 1998, pp. 55-66.

Imagemetrics, Image metrics live driver SDK http://www.imagemetrics,com/livedriver/, 2012. (Retrieved from the Internet on Mar. 7, 2014), 1 page.

Kalal, Z. et al., "Online learning of robust object detectors during unstable tracking," *International Conference on Computer Vision*, 2009, pp. 1417-1424.

Kirby, M. et al., "Application of the Karhunen-Loeve Procedure for the Characterization of Human Faces," *Transactions on Pattern Analysis and Machine Intelligence*, vol. 12, No. 1, 1990, pp. 103-108.

Li, H. et al., "3-D Motion Estimation in Model-Based Facial Image Coding," *IEEE Transactions on Pattern Analysis and Machine Intelligence*, vol. 15, No. 6, 1993, pp. 545-555.

Li, H. et al., "Robust Single-View Geometry and Motion Reconstruction," *ACM Transactions on Graphics (Proceedings SIGGRAPH Asia 2009)*, vol. 28, No. 5, 2009, pp. 175:1-10.

Li, H. et al., "Example-Based Facial Rigging," *ACM Transactions on Graphics (Proceedings SIGGRAPH 2010)*, Jul. 2010, vol. 29, No. 3, pp. 32:1-6.

Paysan, P. et al., "A 3D Face Model for Pose and Illumination Invariant Face Recognition," *2009 Advanced Video and Signal Based Surveillance*, 2009, pp. 296-301.

Pearson, K. "LIII, On Lines and Planes of Closest Fit to Systems of Points in Space," *The London, Edinburgh, and Dublin Philosophical Magazine and Journal of Science*, vol. 2, No. 11, 1901, pp. 559-572.

Pighin, F. H. et al., "Resynthesizing Facial Animation through 3D Model-based Tracking," *Proc. 7th International Conference on Computer Vision*, Kerkyra, Greece, 1999, pp. 143-150.

Pighin, F. et al., "Performance-driven facial animation," *ACM SIGGRAPH 2006 Courses*, ACM, New York, NY, USA, 2006, 9 pages.

Roweis, S., "EM Algorithms for PCA and SPCA," *Advances in Neural Information Processing Systems*, MIT Press, 1998, pp. 626-632.

Rusinkiewicz, S. & Levoy, M., "Efficient Variants of the ICP Algorithm," *International Conference on 3-D Digital Imaging and Modeling*, 2001, pp. 145-152.

Rusinkiewicz, S. et al., "Real-Time 3D Model Acquisition," *ACM Transactions on Graphics (Proc. SIGGRAPH)*, vol. 21, No. 3, Jul. 2002, pp. 438-446.

Saragih, J. M. et al., "Deformable Model Fitting by Regularized Landmark Mean-Shift," *Int. J. Comput. Vision*, vol. 91, No. 2, Jan. 2011, pp. 200-215.

Skocaj, D. & Leonardis, A., "Weighted and Robust Incremental Method for Subspace Learning," *Computer Vision, 2003. Proceedings. Ninth IEEE International Conference on*, IEEE, 2003, pp. 1494-1501.

Sugimoto, T. et al., "A parallel relaxation method for quadratic programming problems with interval constraints," *Journal of Computational and Applied Mathematics*, vol. 60, No. 12, 1995, pp. 219-236.

Sumner, R. W. & Popvic, J., "Deformation Transfer for Triangle Meshes," *ACM Trans. Graph.*, vol. 23, No. 3, Aug. 2004, pp. 399-405.

(56) References Cited

OTHER PUBLICATIONS

Valgaerts, L. et al., "Lightweight Binocular Facial Performance Capture Under Uncontrolled Lighting," *ACM Transactions on Graphics (Proceedings of SIGGRAPH Asia* 2012), vol. 31, No. 6, Article 187:1-12.

Vlasic, D. et al., "Face Transfer with Multilinear Models," *ACM SIGGRAPH 2005 Papers*, ACM, New York, NY, USA, 2005, pp. 426-433.

Weise, T. et al., "Face/off: Live facial puppetry," *Proceedings of the 2009 ACM SIGGRAPH/Eurographics Symposium on Computer Animation*, 2009, pp. 7-16.

Weise, T. et al., "Real-time performance-based facial animation," *ACM Transactions on Graphics (Proceedings SIGGRAPH* 2011), vol. 30, No. 4, Jul. 2011, 10 pages.

Welch, G. & Bishop, G., "An Introduction to the Kalman Filter," Tech. rep., Chapel Hill, NC, USA, 1995, 16 pages.

Williams, L., "Performance-Driven Facial Animation," *SIGGRAPH Comput. Graph.*, vol. 24, No. 4, Sep. 1990, pp. 235-242.

Zhang, S. et al., "High-resolution, Real-time 3D Shape Acquisition," *Proceedings of the 2004 Conference on Computer Vision and Pattern Recognition Workshop* (CVPRW'04) vol. 3—vol. 03, IEEE Computer Society, Washington, DC, USA, 2004, 10 pages.

Zhang, L. & Huang, P., "Spacetime faces: High-resolution capture for modeling and animation," *ACM Annual Conference on Computer Graphics*, 2004, pp. 548-558.

\* cited by examiner

REAL-TIME PERFORMANCE CAPTURE WITH ON-THE-FLY CORRECTIVES

CROSS REFERENCE TO RELATED APPLICATIONS

The present application is a non-provisional of and claims the benefit and priority under 35 U.S.C. 119(e) of U.S. Provisional Application No. 61/881,173 filed Sep. 23, 2013, entitled "REAL-TIME FACIAL ANIMATION WITH ON-THE-FLY CORRECTIVES," the entire contents of which are incorporated herein by reference for all purposes.

BACKGROUND

The present disclosure relates generally to performance capture, and more specifically to real-time performance capture techniques with on-the-fly correctives.

Performance capture techniques generally rely on generic expressions or require extensive training sessions in order to capture expressions of a subject (e.g., facial expressions). Such generic expressions do not accurately reflect the nuances of the subject's expressions. In order to create subject-specific output, pre-captured expressions may be used to train a system for tracking the expressions of the subject. A subject may be required to attend a lengthy training session in order to capture specific expressions so that the system can be adequately trained to model the expressions of the subject. Furthermore, performance capture methods may need to interpolate expressions of the subject due to lack of a particular pre-processed expression being captured in the training session. These interpolated expressions oftentimes lack an accurate depiction of the subtle traits of the subject. As a result, subtle nuances of a subject's expressions are difficult to capture due to the inability of the training sessions to capture every possible expression of a user before tracking begins and also due to interpolation methods lacking the ability to provide accurate results.

Embodiments of the invention address these and other problems both individually and collectively.

SUMMARY

Techniques for real-time and calibration-free performance capture based on video and depth inputs are provided herein. As a result of described techniques, a detailed animation output closely tracking or mirroring the expressions of a subject may be generated. For example, to generate a detailed animation output, a neutral scan of a subject may be initially obtained. Using the neutral scan, a three-dimensional (3D) tracking model may be generated and used to track input data (video and depth data) of the subject. The tracking can be refined over time using an adaptive principal component analysis (PCA) model in order to incrementally improve the 3D model of the subject. Specifically, the adaptive PCA model utilizes shape correctives that are adjusted on-the-fly to the subject's expressions through incremental PCA-based learning. As a result, the animation accuracy of the subject's expressions over time can be improved.

According to at least one example, a computer-implemented method may be provided that includes obtaining a three-dimensional scan of a subject and generating a customized digital model including a set of blendshapes using the three-dimensional scan, each of one or more blendshapes of the set of blendshapes representing at least a portion of a characteristic of the subject. The method may further include receiving input data of the subject, the input data including video data and depth data, tracking body deformations of the subject (e.g., in real or substantial real-time) by fitting the input data using one or more of the blendshapes of the set, and fitting a refined linear model onto the input data using one or more adaptive principal component analysis shapes.

In some embodiments, a system may be provided that includes a memory storing a plurality of instructions and one or more processors. The one or more processors may be configurable to obtain a three-dimensional scan of a subject and generate a customized digital model including a set of blendshapes using the three-dimensional scan, each of one or more blendshapes of the set of blendshapes representing at least a portion of a characteristic of the subject. The one or more processors may be further configurable to receive input data of the subject, the input data including video data and depth data, track body deformations of the subject (e.g., in real or substantial real-time) by fitting the input data using one or more of the blendshapes of the set, and fit a refined linear model onto the input data using one or more adaptive principal component analysis shapes.

In some embodiments, a computer-readable memory storing a plurality of instructions executable by one or more processors may be provided, wherein the plurality of instructions may include instructions that cause the one or more processors to obtain a three-dimensional scan of a subject and generate a customized digital model including a set of blendshapes using the three-dimensional scan, each of one or more blendshapes of the set of blendshapes representing at least a portion of a characteristic of the subject. The plurality of instructions may further include instructions that cause the one or more processors to receive input data of the subject, the input data including video data and depth data, track body deformations of the subject (e.g., in real or substantial real-time) by fitting the input data using one or more of the blendshapes of the set, and fit a refined linear model onto the input data using one or more adaptive principal component analysis shapes.

In some embodiments, a computer-implemented method may be provided that includes obtaining a three-dimensional scan of a subject and generating a customized digital model including a set of blendshapes using the three-dimensional scan, each of one or more blendshapes of the set of blendshapes representing at least a portion of a characteristic of the subject. The method may further include receiving input data, the input data including video data and depth data of the subject, tracking movement of the subject (e.g., in real or substantial real-time) by aligning a model of a prior frame of the input data to a current frame of the input data, and generating a mesh by aligning one or more of the blendshapes of the set to the input data, wherein the mesh represents at least a part of the subject. The method may further include refining the mesh by applying a deformation to the mesh and projecting the deformed mesh to a linear subspace, and generating an animation of the subject using the refined mesh.

In some embodiments, a system may be provided that includes a memory storing a plurality of instructions and one or more processors. The one or more processors may be configurable to obtain a three-dimensional scan of a subject and generate a customized digital model including a set of blendshapes using the three-dimensional scan, each of one or more blendshapes of the set of blendshapes representing at least a portion of a characteristic of the subject. The one or more processors may be further configurable to receive input data, the input data including video data and depth data of the subject, track movement of the subject (e.g., in real or substantial real-time) by aligning a model of a prior frame of the input data to a current frame of the input data, and generate a mesh by aligning one or more of the blendshapes of the set to the input data, wherein the mesh represents at least a part of the subject. The one or more processors may be further configurable to refine the mesh by applying a deformation to the mesh and projecting the deformed mesh to a linear subspace, and to generate an animation of the subject using the refined mesh.

In some embodiments, a computer-readable memory storing a plurality of instructions executable by one or more processors may be provided, wherein the plurality of instructions may include instructions that cause the one or more processors to obtain a three-dimensional scan of a subject and generate a customized digital model including a set of blendshapes using the three-dimensional scan, each of one or more blendshapes of the set of blendshapes representing at least a portion of a characteristic of the subject. The plurality of instructions may further include instructions that cause the one or more processors to receive input data, wherein the input data includes video data and depth data of the subject, track movement of the subject (e.g., in real or substantial real-time) by aligning a model of a prior frame of the input data to a current frame of the input data, and generate a mesh by aligning one or more of the blendshapes of the set to the input data, wherein the mesh represents at least a part of the subject. The plurality of instructions may further include instructions that cause the one or more processors to refine the mesh by applying a deformation to the mesh and projecting the deformed mesh to a linear subspace, and to generate an animation of the subject using the refined mesh.

The foregoing, together with other features and embodiments, will be described in more detail below in the following specification, claims, and accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Illustrative embodiments of the present invention are described in detail below with reference to the following drawing figures.

DETAILED DESCRIPTION

Figure 1:
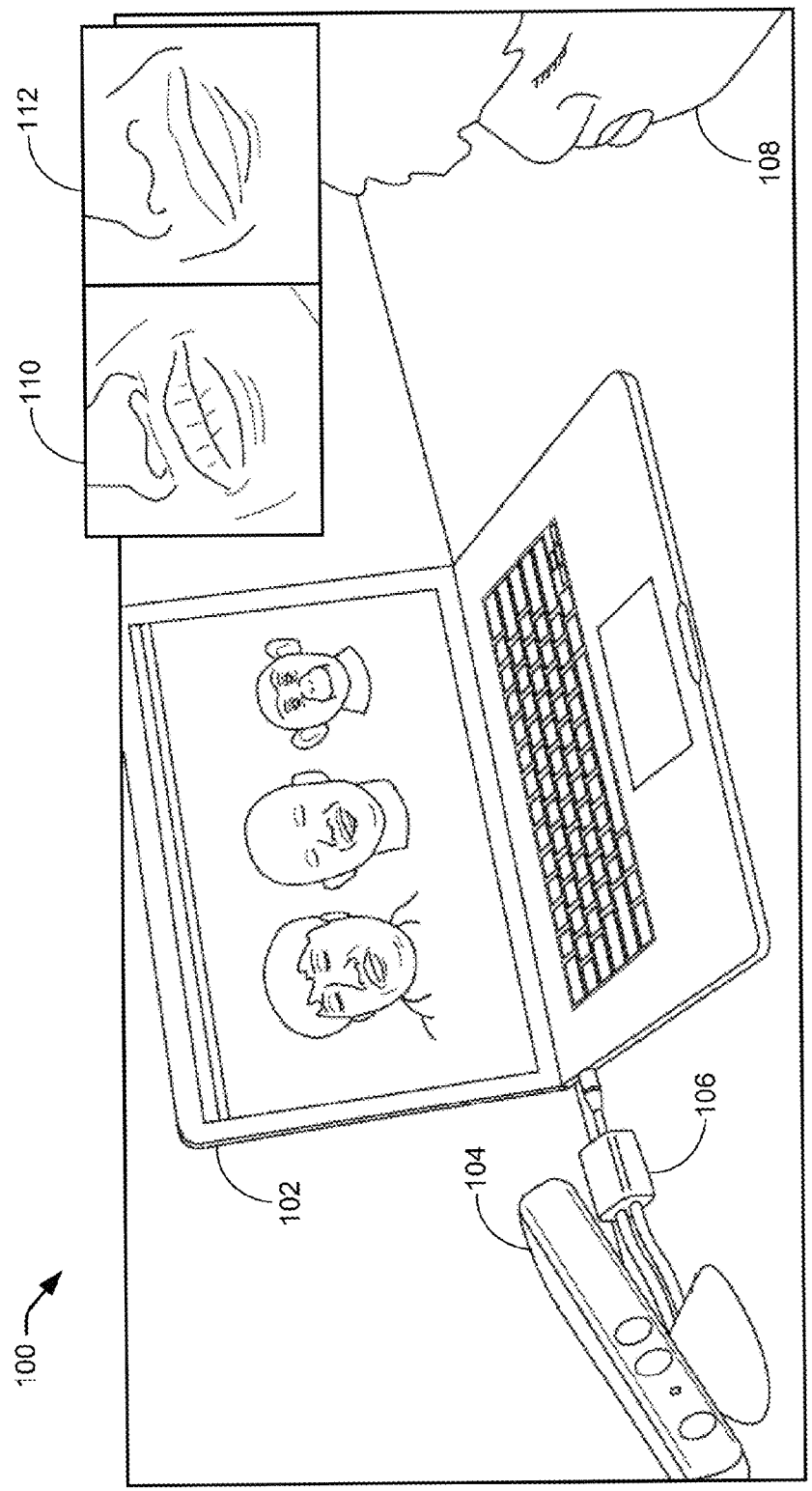
FIG. 1 illustrates an example of a computer system for implementing various embodiments of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

A goal in the generation of high quality performance-driven facial animation is to capture every trait and characteristic of a subject's facial and verbal expressions, and to reproduce these expressions on a digital double or a creature. Many existing animation capture techniques rely on generic expressions that do not accurately reflect the nuances of the subject's expressions. Furthermore, creating realistic digital renderings of a subject (e.g., an actor's face) in film and game production typically involves a very complex pipeline requiring intensive manual intervention. Thus, long turn-around times may be required for generating compelling results. As a consequence of the complex pipeline and long turn-around times, high production costs may be incurred in order to generate realistic animations.

In some aspects, embodiments of the present disclosure can reduce costs associated with the animation process by reducing the complexity of and the turn-around time for generating accurate depictions of expressions. In certain embodiments, a neutral face scan of a subject and a generic 3D model is obtained. The generic 3D model may be fit to the neutral scan in order to generate a neutral 3D model with a neutral expression. Various initial blendshapes may then be applied to the neutral 3D model to develop an approximate 3D tracking model. As used herein, blendshapes refer to linear geometric models that are used in facial animation to represent expressions of a subject. The approximate 3D tracking model includes a customized head and face of the subject with generic expressions according to each of the initial blendshapes. The approximate 3D tracking model is then used to track input data, such as depth data and video of the subject. For example, real-time 3D sensors (e.g., MICROSOFTS's KINECT, a short range Primesense Carmine 1.09 depth sensor, or the like), which are robust to illumination changes and occlusions, may be used to capture dense depth input data and video data. The tracking may be refined over time by improving the initial blendshapes. As a result, the approximate 3D tracking model of the subject may be also refined over-time. In one embodiment, the initial blendshapes may be refined using an adaptive linear model during the tracking, such as an adaptive principal component analysis (PCA) model. Linear models, such as PCA models, may be used due to their level of expressiveness and their compact representation for efficient processing. In the event an adaptive PCA model is used, the adaptive PCA model utilizes shape correctives that adjust on-the-fly to the subject's expressions through incremental PCA-based learning. As a result, the tracking fidelity of the subject's expressions are improved over time.

As described in more detail below, the facial performance capture techniques described herein provide a real-time facial animation framework where a linear subspace (e.g., a principal component analysis space, or the like) may be used to compensate for incomplete input data and occlusions. In one embodiment, the adaptive PCA model, based on correctives (e.g., corrective shapes), rapidly adapts to the expressions of a performing subject during tracking. For example, as mentioned above, the process may begin with obtaining an initial 3D scan of the subject in a neutral pose. From there, a customized digital model and an initial set of generic linear blendshape expressions are automatically generated using the obtained initial 3D scan. Thereafter, the face of the subject may be tracked by solving for the best fit to input data of the subject using these generic blendshapes. This step is followed by fitting a refined linear model onto the input data using adaptive PCA shapes. The adaptive PCA model includes anchor shapes and corrective shapes. Anchor shapes include meshes obtained from a PCA computation of the initial blendshapes. The anchor shapes may be used to prevent the tracking model from converging to a bad model due to noisy input data, which may be referred to as drifting. Drifting may occur if, during tracking, too many samples are collected that vary too far from expressions spanned by the initial blendshapes. Corrective shapes include additional meshes (or linear basis) representing modes that are trained during tracking in order to form the adaptive PCA shape space. A mode includes a linear basis represented by a mesh. The corrective shapes are used to learn the distinct look and expressions of the actor during tracking. As a result of using corrective shapes, the adaptive PCA model can capture certain facial expressions that cannot be represented by the initial blendshapes.

In one embodiment, to train the correctives, the resulting tracked model of the adaptive PCA fit may be warped to the current input depth map to determine new shapes that are outside of the adaptive PCA space. This tight out-of-adaptive space deformation uses a 3D depth map and a particular number (e.g., 40) of two-dimensional (2D) facial features (e.g., lip contours, eye contours, eyebrows, or the like). The 2D facial features may be used to boost the training of the tracking model with reliable samples. For example, a well-trained 2D facial feature tracker (e.g., Active Appearance Models (AAM), or the like) may be used to detect sparse facial landmarks (eye and mouth contours, eyebrows, etc.) on the input video and an efficient mesh deformation algorithm may be used to warp the result of the adaptive PCA fit to high frequency details in visible depth map regions of the current input depth map. By using a combination of dense depth maps and texture features around various facial features (e.g., eyes, lips, or the like) in the manner described, natural dialogues and nuanced actor-specific emotions may be accurately captured. Furthermore, optimization of the adaptive PCA space may be obtained using an incremental PCA learning approach based on, for example, an expectation-maximization (EM) algorithm. In some embodiments, the incremental PCA learning approach may be used to optimize the adaptive PCA space by training the corrective shapes of the adaptive PCA model. For example, the corrective shapes may be trained by identifying new shapes outside of the PCA space and modifying the PCA space based on the identified shapes. As a result, the adaptive PCA model disclosed herein not only improves the fitting accuracy for tracking as subject, but also increases the expressiveness of a retargeted character.

The fitting of the adaptive model progressively improves during a performance. As such, extra capture or training sessions to build the model are not required. As a result, the animation techniques described herein are highly deployable and easy to use. For example, the techniques described herein can closely track any subject, starting by capturing just a single face scan of the subject in a neutral pose. Furthermore, the performance capture techniques can be immediately used once a neutral expression has been captured. Whether in communication applications or interactive games involving virtual avatars, these techniques enable general ease-of-use tools that are configured to provide accurate tracking using on-the-fly correctives. In a professional setting, such as film production, actors may choose to use the capture techniques disclosed herein as a calibration tool to build an optimal tracking model for their faces without going through a large and challenging set of prescribed facial expressions during a training session. The actors may also immediately test the tracking quality. Since the model is trained with fine-scale deformations around particular features of the subject (e.g., eye regions, mouth regions, or the like) using 2D facial feature constraints, the techniques described herein are particularly effective in recovering or capturing emotions, conversations, and subtle nuances of subject-specific expressions. In addition to improving the tracking quality and performance capture workflow of a real-time performance capture system, the techniques described herein may also be used to achieve more accurate and expressive facial retargeting to a target character. Accordingly, real-time markerless facial performance capture can be immediately used by any subject without training, and ensures accurate tracking using an adaptive PCA model based on correctives that adjusts to the subject's expressions on-the-fly. Furthermore, real-time facial performance capture may be used as a pre-visualization technique that may help directors plan shots more carefully, allow animators to quickly experiment with face models, and assist actors in getting into character when driving a virtual avatar.

FIG. 1 shows an example of a computer system 100 for implementing various embodiments of the present invention. The system 100 includes a computer 102, an input sensor 104, and one or more connectors 106 for connecting the input sensor 104 to the computer 102. The computer 102 may include any type of computing device, such as a mobile device (e.g., a laptop, a mobile phone, a personal digital assistant, or the like), a desktop/workstation computer, a server, a video game console, a set-top box, or the like. The computer 102 may include a device that has communications capabilities for communicating with one or more wired or wireless networks (e.g., the Internet, a wireless local area network, or the like) or a device without any ability to communicate with one or more networks. The one or more connectors 106 may be a physical cable or a wireless connector. The one or more connectors 106 may include an input/output device, such as USB cable, a video cable (e.g., a VGA cable, DVI cable, an S-Video cable, or the like), an HDMI cable, and/or the like.

The input sensor 104 may be used to capture input data of the subject 108. The input data may include scans, depth data (e.g., one or more depth maps), video with 2D features, and/or the like. In some embodiments, the input sensor 104 may be used to capture scans and/or depth data, and a separate camera may be used to capture video data. In some embodiments, the input sensor 104 may include a depth sensor (e.g., KINECT depth sensor, a short range Primesense Carmine 1.09 depth sensor, or the like). A depth sensor may also be referred to herein as a camera. The input sensor 104 may run in real or substantial real-time along with the computer 102 as the subject 108 is making facial expressions. For example, the user may make a facial expression 110 that is captured by the input sensor 104. Using the input data, a facial performance capture program running on one or more processors of computer 102 may perform the techniques described in further detail below to render the output 112 including a model of the subject's facial expression.

Figure 2:
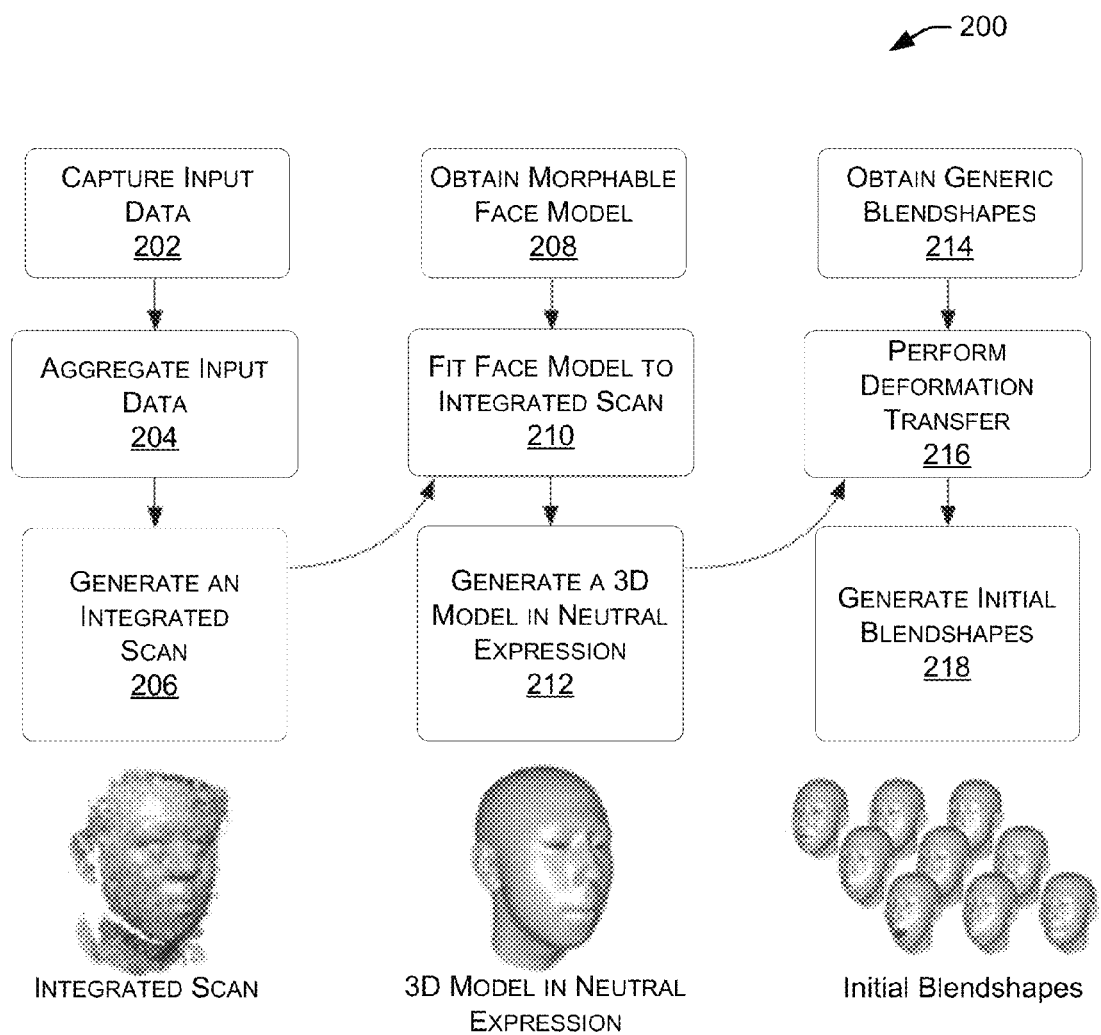
FIG. 2 shows an example of techniques for constructing initial blendshapes.

As noted above, a 3D tracking model made up of various initial blendshapes is generated through initially obtaining a neutral scan of a subject. FIG. 2 illustrates a process 200 for constructing the initial blendshapes using one or more morphable face models for a neutral expression. After obtaining a neutral scan of a subject, the process 200 is performed to generate the initial blendshapes. As discussed, the initial blendshapes are included in the 3D tracking model used to track input data of the subject. The process 200 begins at 202 by capturing input data of the subject. The input data may be captured by any suitable device, such as the input sensor 104 of FIG. 1. In some embodiments, the input data may include a depth map and 2D texture features (e.g., in video) of the subject. At 204, the input data is aggregated. For example, multiple input depth map frames may be aggregated using volumetric scan integration and a rigid alignment that is based on a fast iterative closest point (ICP) method. As a result of the aggregation of the input data, an integrated scan is generated at 206. An integrated scan may be generated by collecting scans of the subject, transforming the scans into a common coordinate system, and averaging nearby scans to cancel out high-frequency noise. In some embodiments, a merged 3D point cloud with better coverage of the neutral face is then obtained.

A morphable face model is obtained at 208 by computing the PCA of a large collection of face scans that have consistent mesh topology with consistent correspondences between vertices on each mesh and their projection onto the corresponding depth map. At 210, the morphable face model may then be fit or warped onto the integrated scan of the subject in order to produce a 3D model in a neutral expression at 212. The morphable face model may be a generic 3D model of a statistically average face, and may include a linear model with a linear combination of different generic facial identities. For example, the morphable face model may be derived from a number of human subjects (e.g., from 200 human subjects). A database may store the linear model. The morphable face model may be fit to the integrated scan at 210 by performing rigid ICP, PCA fitting, and non-rigid ICP. For example, the fitting may include using a linear fit of principal component analysis (PCA) modes obtained from the number of human subjects. A mode is a linear basis represented by a mesh. The fitting may also include an optimization that solves for both the global rigid transformation and the PCA coefficients. Different coefficients may be identified and adjusted in order to change the facial identities of the morphable face model to form the neutral model tailored to the subject. As a result, a PCA model is created.

In some embodiments, the PCA model may be additionally deformed to fit the input data of the subject. For example, a non-rigid registration procedure may be performed to deform the PCA model to the input data in order to capture details that are not present in the PCA model. Put another way, the PCA model may be deformed onto the integrated scan of the subject using a non-rigid ICP algorithm. In some aspects, for both deformable alignment processing (PCA fitting and non-rigid ICP), point-to-plane constraints may be used on the input data as well as point-to-point 2D feature constraints (e.g., lips, eyes, eyebrows, or the like). Following the aforementioned processing, the 3D model in the neutral expression is output at 212.

A set of generic blendshapes are then obtained at 214. For example, the generic blendshapes may be sculpted from a collection of generic expressions (e.g., 23 facial action coding system (FACS) expressions). The collection of generic expressions may be retrieved from a database and/or from a program that includes the expressions. At 216, the generic blendshapes and the 3D model in the neutral expression may be processed by a deformation transfer algorithm to generate the set of initial blendshapes. For example, the deformation transfer may apply the deformation exhibited by each of the generic blendshapes onto the 3D model in the neutral expression. As a result, the initial blendshapes are output at 218. The initial blendshapes may be included in an approximate 3D tracking model used to track the input data of the subject. In one aspect, the initial blendshapes can be considered personalized, coarse approximations of the subject's real expressions.

Figure 3:
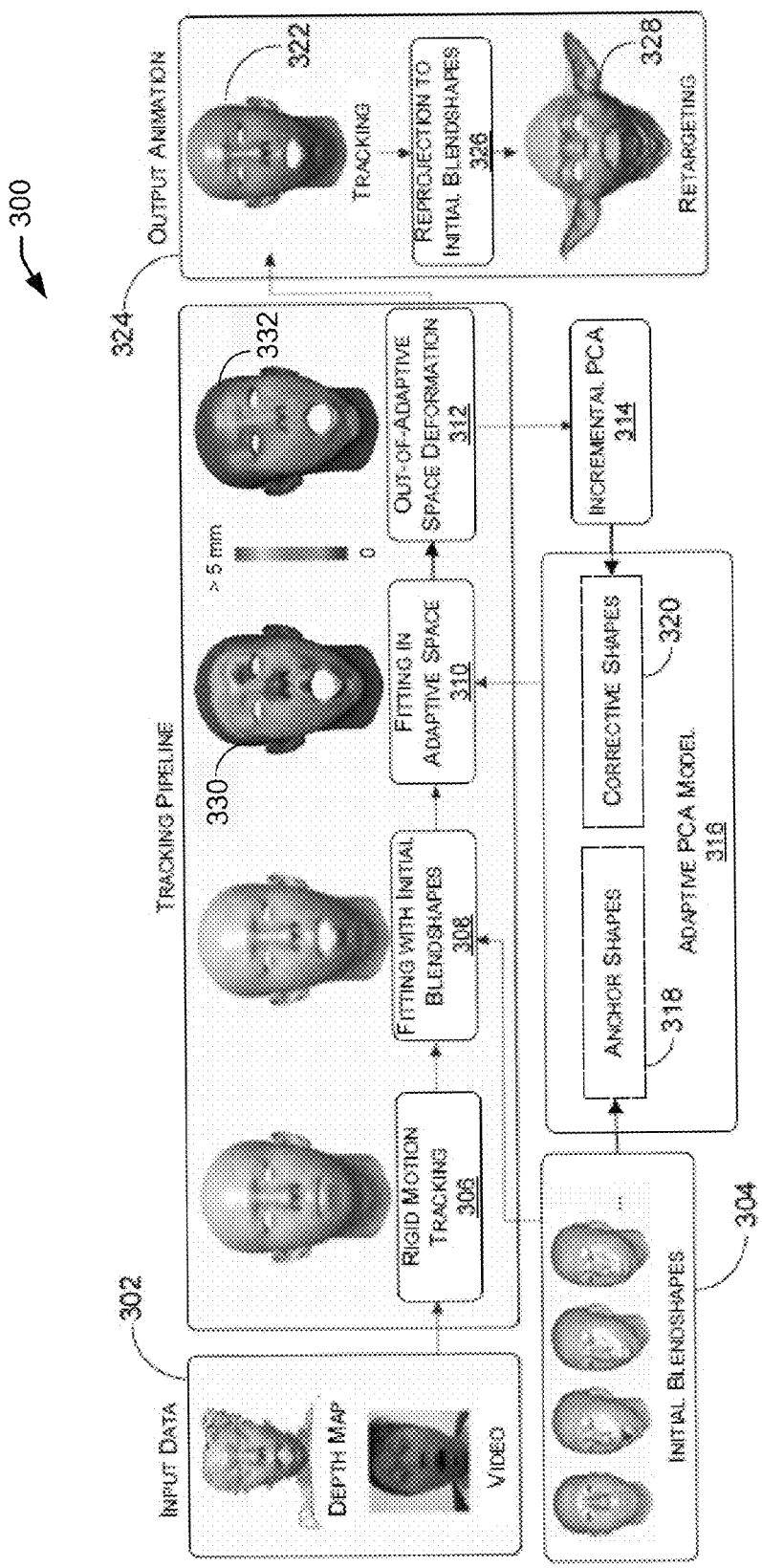
FIG. 3 illustrates an example of a real-time facial animation tracking pipeline using an adaptive model.

After creating the initial blendshapes of the subject, tracking of the subject's face may be performed. FIG. 3 illustrates a real-time facial animation tracking process 300 using an adaptive model 316. The process 300 may be used to refine the initial blendshapes in order to generate a tracking output that accurately tracks the subject's expressions. The process 300 may be iteratively performed on a frame-by-frame basis, and may iteratively improve accuracy of the tracking output as each frame is processed. After each iteration, a tracked 3D model may be produced for each frame. At 302, input data is obtained. The input data may include one or more depth maps and video data of the subject. The input data may be captured in real-time as the subject is performing different expressions. The input data may be captured by any suitable device, such as the input sensor 104 of FIG. 1. When the process 300 first begins (i.e., no previous frames have yet been processed), the initial input may be the approximate 3D tracking model in a neutral expression.

To track the actor's face, rigid motion tracking may be performed at 306 in order to rigidly align the tracked 3D model of a previous frame (e.g., an immediately previous frame) to the current input frame. The rigid alignment includes solving for a rigid motion without considering the expressions of the subject. For example, the head of the subject may be rigidly positioned without solving for the subject's expressions. The rigid motion tracking produces a rigid transformation that indicates an approximate position of the subject's face. In one embodiment, the rigid motion tracking may include solving for a global rigid transformation using a fast rigid ICP technique. In some embodiments, processing speed may be increased by reducing the amount of data from the depth map of the input data 302. For example, to reduce the amount of data included in the depth map, the currently received input frame may be cropped with a face bounding window (200×200 pixels) centered around the tracked model from the previous frame (or the neutral model for the first frame). In some embodiments, the initial face detection is obtained from a 2D bounding box of the facial features and re-detection is only performed whenever the face model is lost (e.g., when the face gets partially or completely occluded and tracking cannot be performed). The data of the resulting cropped frame may then be tracked using the fast projection variant of the rigid ICP process with a point-to-plane metric. In some embodiments, correspondences between vertices on the tracked mesh and their projection onto the depth map may be analyzed, and correspondences that are a certain threshold distance away (e.g., 25 mm away) may be pruned. The rigid ICP process finishes when the average distance of unpruned correspondences to the depth map is below a certain distance (e.g., 1 mm, 2 mm, 3 mm, or the like).

At step 308, the input data is fit with one or more initial blendshapes. In some embodiments, step 308 includes solving for the expression that the subject is currently performing and applying the appropriate initial blendshape based on the solving. In one aspect, an initial blendshape fit may be performed for each input frame using 3D point constraints on the input scans (the 3D depth map data) and 2D facial features constraints (the video data). The 2D facial feature constraints enable the identification of a correct shape of the subject that cannot be easily identified using the depth data. For example, certain expressions that the subject performs may appear the same as another expression in the depth maps, but may appear differently in the video. For example, the subject may raise an eyebrow, which might not be conveyed by the depth map because the depth of the eyebrow may not change. However, the 2D video texture does change as the eyebrow is raised. As a result, one or more expressions of the subject may be detected using 2D facial feature constraints indicated in the video as well as the depth data. Thus, the 2D facial feature constraints help to correct and adjust the initial blendshapes to the depth map.

In some embodiments, the resulting blendshape fit is represented by a mesh with vertices $v^1 = b_0 + Bx$, where $b_0$ is the neutral expression mesh, the columns of B are the generic expression-based expression meshes (e.g., FACs-based expression meshes), and x represents the blendshape coefficients. Similar to ICP, the linear blendshape model is fit to the input data 302 by alternating between finding per-vertex correspondences and solving for blendshape coefficients. In one example, using the mesh equation above, the expression $v_i^1(x) = (b_0 + Bx)_i$ is the i-th blendshape mesh vertex, where $b_0$ is the neutral expression mesh, the columns of B are A=23 meshes of FACS-based expressions, and x are the blendshape coefficients. The following point-to-plane fitting term may then be used:

$$c_i^S(x) = n_i^T(v_i^1(x) - p_i), \quad (1)$$

where $p_i$ is the point of the depth map that has the same depth sensor space (which may be referred to as camera space) coordinate as $v_i^1$ and $n_i$ the surface normal of $p_i$. Point-to-plane may be used instead of point-to-point constraints for more robust convergence in the optimization.

The 2D facial feature constraints may then be pre-associated to a fixed set of mesh vertices of the tracked 3D model. A facial feature fitting term is then formulated as one or more vectors between the 2D facial features and their corresponding mesh vertices in camera space:

$$c_j^F(x) = \begin{bmatrix} 1 & 0 & -u_j^x \\ 0 & 1 & -u_j^y \end{bmatrix} Pv_j^1(x). \quad (2)$$

where $u_j = [u_j^x, u_j^y]$ is the j-th 2D facial feature position and $P_{3\times3}$ is the camera projection matrix.

Figure 6:
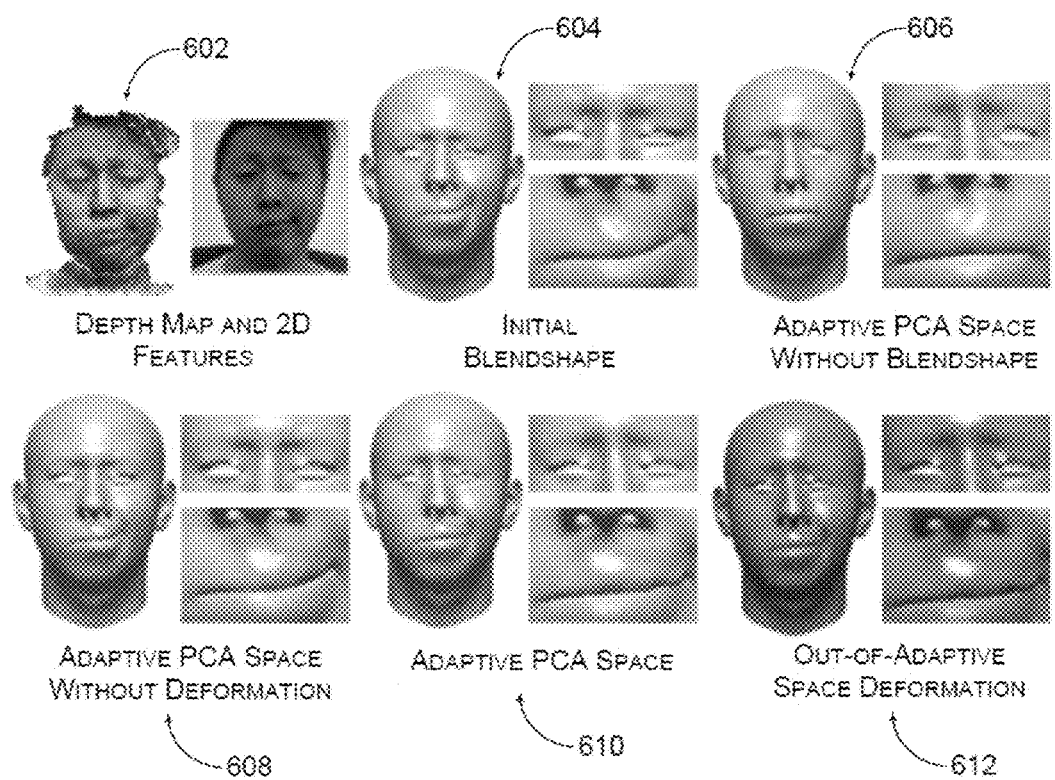
FIG. 6 shows the influence of each stage of the tracking pipeline.

The process 300 at 308 then solves for the blendshape coefficients $x = [x_1 \ldots x_A]$ using the terms from Equation (1) and (2) and minimizes the following $L^2$ energy:

$$\min_x \sum_i (c_i^S(x))^2 + w \sum_j \|c_j^F(x)\|_2^2,$$

where $w = 5 \cdot 10^{-5}$ is the weight of the facial feature constraints and $x_1 \in [0,1]$ are the blendshape coefficients. A fast iterative projection method is used to solve the bounded dense linear system. Due to the localized nature of blendshapes and because the coefficients are bounded, large motions can be recovered very effectively (as shown in FIG. 6). A fixed number of iterations may be performed between this optimization and the closest point search (e.g., 3 times). In some embodiments, a standard Kalman filter may be applied to the blendshape coefficients to effectively reduce noise caused by the depth sensor data of the input data 302. For example, the linear state variable for predicting the position and velocity may have a process noise of 0.05 and a measurement noise of 0.02. After the aforementioned processing, the appropriate initial blendshape expression is fit to the current frame of the input data 302.

The fitting from step 308 is then refined at step 310 by fitting or warping the blendshape model to a linear subspace (e.g., an adaptive PCA space, or the like) using a progressively updated adaptive model 316 (e.g., an adaptive PCA model). As noted above, the initial blendshapes 304 are personalized and coarse approximations of various real expressions of the subject. For example, one blendshape may approximate how the subject would smile. By performing step 310, and fitting the blendshape model to a linear adaptive PCA subspace, expressions that are personalized to the subject may be obtained. In order to create personalized expressions, the PCA space extends the space that is spanned by the initial blendshapes with PCA modes. In essence, the PCA modes describe the difference between the real expressions of the subject and the expressions that have been approximated by the initial blendshapes. By determining the difference between the real and approximated expressions, the linear PCA space more accurately describes the actual expression of the subject as compared to using the initial blendshapes, since the expressions of the initial blendshapes are created using a generic expression database.

Step 310 is divided in two stages, a deformation stage and a subspace projection stage. During the deformation stage of 310, the fitting from step 308 may be refined using a deformation algorithm (e.g., a Laplacian deformation algorithm) with the same 3D point constraints (the one or more depth maps) and 2D facial feature constraints on the input scans that were used during step 308 in order to establish reliable correspondences between the tracked model and the input scan. The initial blendshape that is chosen is deformed onto the current frame using a mesh deformation technique so that the resulting model matches the details of the subject's expression in that frame more accurately than the initial blendshape. Various mesh deformation techniques may be used, such as a Laplacian deformation, an as-rigid-as-possible deformation, a gradiant space deformation, a bending-stretching-minimization deformation, a Poisson deformation (if right hand side is not zero), or the like. For example, a Laplacian deformation $v_i^2 = v_i^1 + \Delta v_i^1$ is performed using both the 3D point constraints and the 2D facial feature constraints. A Laplacian smoothing term regularizes the vertex displacements $\Delta v_i^1$ constrained by the sparse 2D feature constraints, and also reduces the spatial high-frequency noise introduced by the 3D depth sensor. The deformation optimization solves for all the vertices that are in the frontal part of the model, subject to Dirichlet boundary conditions. Accordingly, a mesh is obtained with vertices $v^2=v^1+\Delta v^1$, where $v^1$ is obtained in step 308 and $\Delta v^1$ are the per vertex displacements.

In some embodiments, step 310 may further include using a set of optimization constraints (e.g., using point-to-point constraints and 2D feature constraints) where pre-factorization is possible (e.g., the left hand sides of the sparse linear system remain constant over time). For instance, using point-to-plane constraints may not allow pre-factorization.

A point-to-point fitting term may be used between every mesh vertex and its corresponding projection into camera space:

$$c_i^P(\Delta v_i^1)=\Delta v_i^1-(p_i-v_i^1), \quad (3)$$

and 2D feature terms using a weak projection formulation:

$$c_j^W(\Delta v_j^1) = \begin{bmatrix} 1 & 0 & -(u_j^x-v_j^{1,x}) \\ 0 & 1 & -(u_j^y-v_j^{1,x}) \\ 0 & 0 & 1 \end{bmatrix} P\Delta v_j^1 - \begin{bmatrix} 0 \\ 0 \\ (p_j^z-v_j^{1,z}) \end{bmatrix}, \quad (4)$$

where $p_j=[p_j^x, p_j^y, p_j^z]$ and $v_j^1=[v_j^{1,x}, v_j^{1,y}, v_j^{1,z}]$. This term is rephrased compactly as:

$$c_j^W(\Delta v_j^1)=H_j(u_j)P\Delta v_j^1-d_j, \quad (3)$$

Cotangent weights are defined with respect to the neutral mesh for the Laplacian smoothing terms:

$$C^L(\Delta v^1) = L(b_0)\begin{bmatrix} \Delta v_1^1 \\ \vdots \\ \Delta v_N^1 \end{bmatrix} = L(b_0)\Delta v^1. \quad (6)$$

Equation (3), (5), and (6) can then be stacked into a single over constrained linear system:

$$\begin{bmatrix} H_1 & & & \\ & \ddots & & \\ & & H_F & \\ \hline & & & w_1I \\ \hline & & & & w_2I \end{bmatrix}\begin{bmatrix} Q \\ I \\ L \end{bmatrix}\Delta v^1 = a, \quad (7)$$

where Q is a 3F×3N matrix stacked from the projection matrix P from Equation (4), I denotes a 3N×3N identity matrix, $w_1$ is the weight for the point-to-point depth map constraints (e.g., $w_1=0.1$), $w_2$ is the weight for the Laplacian regularization constraint (e.g., $w_2=100$), and a contains all the constant terms from the constraints. The above system can be rewritten as $GK\Delta v^1=a$, where the least-square solution can be readily computed using a Moore-Penrose pseudoinverse:

$$\Delta v^1=K^T(KK^T)^{-1}G^{-1}a.$$

Because K is sparse and constant, $KK^T$ only needs to be pre-factorized once. Moreover, $G^{-1}$ can be computed due to its square and sparse structure. Therefore, the entire linear system can be solved efficiently. In some embodiments, a sparse LDLT solver from a C++ Eigen Library may be used for the pre-factorization. As a result, using the above equations, the vertices from the mesh $v^1$ are displaced in order to create the mesh $v^2$ ($v^2=v^1+\Delta v^1$).

The deformation stage of step 310 is followed by the subspace projection stage, in which the deformed mesh is projected onto the continuously improving linear adaptive PCA model 316 in a linear adaptive PCA subspace. The deformed mesh is projected onto a linear subspace so that the mesh is made linear, which allows it to be used as an input to continuously train the linear adaptive PCA tracking model 316. The PCA subspace projection is formulated as follows:

$$v^3=(MM^T(v^2-b_0))+b_0.$$

where $v^3=[v_1^3 \ldots v_N^3]^T$ and $v^2=[v_1^2 \ldots v_N^2]^T$. In particular, $v^3=My+b_0$, where $y=[y_1 \ldots y_A, y_{A+1} \ldots y_{A+K}]^T$ are the resulting adaptive PCA coefficients. Accordingly, projection of the deformed mesh onto the adaptive PCA model 316 produces a mesh with vertices $v^3=(MM^T(v^2-b_0))+b_0$. The columns of the matrix M are the bases of the adaptive PCA model 316. The linear adaptive PCA model space is an orthonormal basis and includes A anchor shapes 318 and K additional corrective shapes 320. The adaptive PCA space is spanned by the A+K PCA shapes, which are stacked to form the matrix $M=[M_A,M_K]$. The A columns of $M_A$ are the orthonormalized vectors of the initial blendshapes and form the anchor blendshapes A. The K columns of $M_K$ lie in the null space of $M_A$ and represent the corrective shapes 320. The corrective shapes 320 (also referred to as "correctives 320") capture the fine-scale details that are not present in the approximate 3D tracking model with the initial blendshapes.

The projection of the deformed mesh $v^2$ onto the adaptive PCA subspace to get the linear mesh $v^3$ is beneficial because the deformed mesh $v^2$ may contain outliers and visible artifacts due to the noisy and incomplete input depth map from the input data 302. The adaptive PCA model 316 is trained from a large number of samples that are not outliers, and thus does not encounter the same problems as the deformed mesh. Moreover, the accumulation of multiple frames during incremental PCA also averages out the artifacts caused by incomplete input data.

As a result of fitting the blendshape model to the linear adaptive PCA subspace, as described above, personalized expressions may be obtained for the subject. As illustrated in FIG. 3, the heat map 330 corresponding to step 310 shows the difference between fitting with the initial blendshapes and refining the blendshape model by fitting it onto the adaptive space (the deformation and projection stages). As can be seen by the heat map 330, the difference between the initial blendshape fitting and the adaptive PCA space fitting is significant, resulting in a more accurate depiction of the subject's expressions.

The tracking process 300 continues by performing an out-of-adaptive space deformation at 312. In some embodiments, two warping steps are performed as part of the out-of-adaptive-space deformations: (1) to feed an incremental PCA process with reliable data and (2) to generate the final output mesh.

The out-of-adaptive-space deformations for feeding the incremental PCA process at 314 may be used to build the linear adaptive PCA space. As noted above, the linear adaptive PCA space extends the space that is spanned by the initial blendshapes with PCA modes in order to create personalized expressions. However, the PCA space must first be trained or built based on the received data. Using the out-of-adaptive space deformation of 312, the PCA space is continuously trained as the subject is being tracked. The out-of-adaptive-space deformations for feeding the incremental PCA process includes training the correctives 320 of the adaptive PCA model (M) 316 in the adaptive PCA space. For example, the anchor shapes 318 may be initialized with A=23 orthonormalized vectors from the initial blendshapes, and the K correctives shapes 320 may be learned to improve the fitting accuracy over time. To train the correctives 320, new expression samples S of the subject may first be collected that fall outside of the currently used adaptive PCA space. These samples are obtained by warping the result of the initial blendshape fit to fit the current input depth map and 2D facial features using a per-vertex Laplacian deformation algorithm. These samples are used to refine the corrective shapes 320 using the incremental PCA technique at 314.

In order to train the linear adaptive space, a mesh deformation (e.g., a Laplacian deformation) may be performed on the mesh $v^3$ and the resulting deformed mesh $v^4$ may be fed as input into an incremental PCA process at 314. The deformed mesh $v^4$ may also be output for retargeting (described further below). In one example, the adaptive PCA model may trained in the linear adaptive PCA space at step 316. In order to train the adaptive PCA model, the mesh $v^3$ can be deformed to fit the current frame using, for example, a Laplacian deformation by solving the system defined by Equation (7) above, and setting $w_1$=0.1 and $w_2$=100. Accordingly, the final output is an additional Laplacian deformation on top of the adaptive PCA result to obtain a mesh with vertices $v^4=v^3+\Delta v^3$. In some embodiments, the resulting mesh $v^4$ may be similar to $v^2$, so $v^2$ may be used directly as input to the incremental PCA process in order to save the cost of an extra computation of Laplacian deformation. For the training samples of the incremental PCA algorithm, the 3D depth constraints may be used in addition to the 2D facial features constraints (see FIG. 7).

Figure 8:
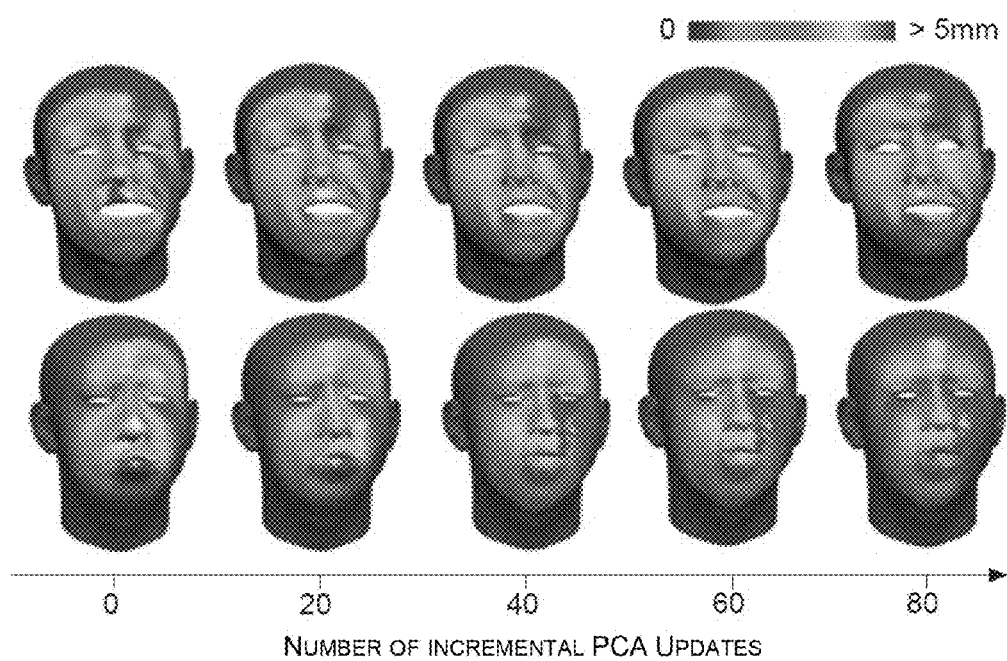
FIG. 8 shows the effect of using correctives during tracking with a continuously updated adaptive PCA model.

The resulting out-of-adaptive-space meshes $v^4$ (or $v^2$ to save computation costs) for each frame are used as input data to train the adaptive PCA model (M) 316 for improved tracking accuracy (see FIG. 8). As mentioned previously, the adaptive model 316 $M=[M_A, M_K]=[m_1 \ldots m_A, m_{A+1} \ldots m_{A+K}]$ includes anchor 318 and corrective shapes 320. The anchor shapes 318 prevent the adaptive tracking model 316 from drifting and are computed as the principle components of the initial blendshapes; hence $BB^T=M_A DM_A^T$.

For every incoming out-of-adaptive-space mesh $v^4$ or $v^2$, the incremental PCA process verifies that the sample is "valid" before updating $M_K$. In one example, a sample is considered "valid" if the sample is at least a threshold distance from the anchor space $M_A$ (i.e., $\|s\|_2^2 > 1$) and if it is not an outlier (i.e., $\|s\|_2^2 < 100$). Because only the corrective space spanned by $M_K$ is to be updated, the input samples $S=(v^2-b_0)-(M_A M_A^T)(v^2-b_0)$ may be defined as the projected residuals onto the anchor space.

In some embodiments, an expectation-maximization (EM) algorithm may be used as an incremental PCA learning approach. The EM algorithm progressively approximates a solution of $M_K$ given a collection of new valid samples S. The samples may be collected with a buffer $S=[s_1 \ldots s_S]$. For example, 200 samples may be collected. The first incremental PCA update happens once the buffer is full; then $M_K$ is recomputed for every valid incoming sample.

$M_K$ is initialized with the first K valid samples and orthogonalized via standard QR factorization. Because the samples are already orthogonal to $M_A$, M is semi-orthonormal; the columns are normalized and orthogonal to each other.

The EM algorithm may generally be used to estimate probabilistic models with hidden states, such as Hidden Markov Models, Mixture of Gaussians, or Mixture of Experts. In the techniques described herein, the hidden state variables are the coefficients $Y_K=[y_1 \ldots y_S]$ of the model represented by the corrective shapes 320 in $M_K$. The EM algorithm iterates between an E-step (to find the "E"xpected value of the hidden state, given a model guess) and an M-step (to "M"aximize the expected model likelihood given the hidden states). In particular, the iterative estimations of MK converge to the true PCA solution using the EM algorithm. The following illustrates the EM algorithm iterations for the domain:

1. E-step: compute the corrective space coefficients $Y_K$ from the input samples S given a guess of the corrective shapes 320 in $M_K$:

$$Y_K=(M_K^T M_K)^{-1} M_K^T S.$$

2. M-step: update the corrective shapes 320 in $M_K$ from the input samples S given the corrective space coefficients $Y_K$:

$$M_K=SY_K^T(Y_K Y_K^T)^{-1}.$$

The above EM steps may be repeated (e.g., twice) and QR factorization may be used again to orthonormalize $M_K$ because EM does not have any orthonormal constraints. The resulting $M_K$ replaces the old corrective shapes 320 in $M_K$, and thus the correctives 320 are updated. In general, the buffer size S may be chosen to be as large as possible in order to keep a longer history of collected samples, but not too large in order to prevent the EM algorithm from slowing down.

The heat map 332 corresponding to the out-of-adaptive-space deformation illustrates the difference between the tracking output and the current adaptive PCA model 316. The error is decreased with every incoming training sample.

The out-of-adaptive-space deformations also are performed in order to generate a final output mesh as the tracking output. While the results from the adaptive PCA space are superior to those obtained from using only the initial blendshapes, the accuracy of the adaptive PCA model may be further refined in order to generate the final output mesh, similar to the process described above with respect to the input to the incremental PCA process. However, only 2D facial features may be used as constraints for generating the final output mesh since the depth maps may be noisy. In particular, the adaptive PCA model output from 310 may be refined by applying the additional Laplacian deformation with only the 2D facial features as constraints to obtain the final output mesh $v^4=v^3+\Delta v^3$ and setting $w_1$=0 (or simply eliminating the corresponding rows) and $w_2$ to a fairly high number (e.g., $w_2$=100) (see FIG. 7). Accordingly, the final output mesh includes the deformed mesh $v^4$ using only the 2D constraints. The final output mesh may then be provided as the tracking model 322 that is output for use in performing an output animation at step 324.

Figure 9:
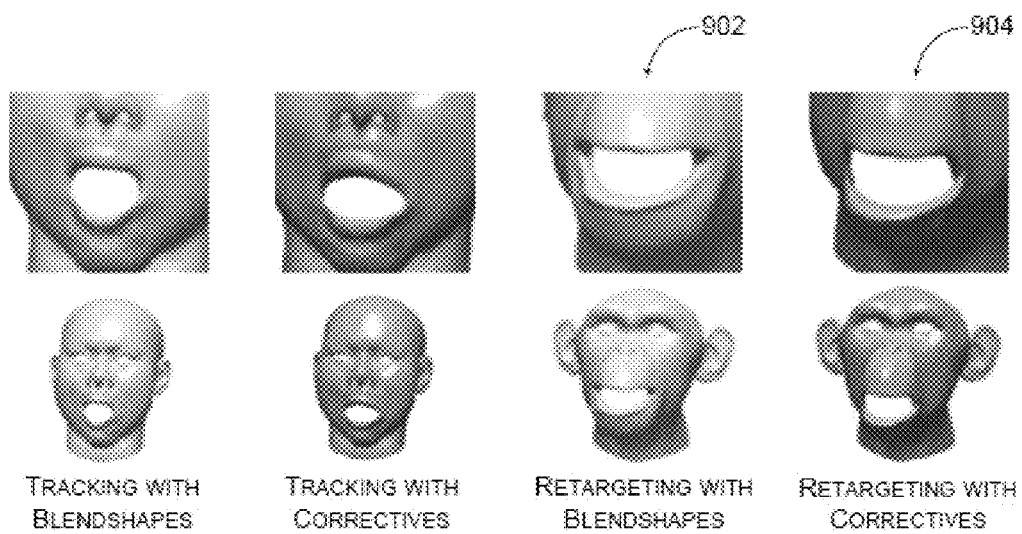
FIG. 9 illustrates the transfer of blendshape coefficients for retargeting.

Process 300 continues by performing output animation at 324. Blendshape coefficients may be used during the output animation 324 for expression retargeting to a character, such as the character 328. While the initial blendshape coefficients 304 may be immediately used for expression retargeting, more expressive retargeting may be obtained by re-solving for blendshape coefficients using the final output mesh vertices of $v^4$. In order to solve for blendshape coefficients using $v^4$, mapping back to blendshape space is needed since the adaptive tracking model lies in the PCA space. In some embodiments, example-based facial rigging may be used. As a result, the mesh $v^4$ may be mapped back to the vector $v^1$, but with updated blendshape coefficients x. The extracted blendshape coefficients x may then be transferred to a compatible blendshape model of a target character (e.g., character 328) for retargeting. FIG. 9 shows the results of transferring blendshape coefficients for retargeting.

Figure 4:
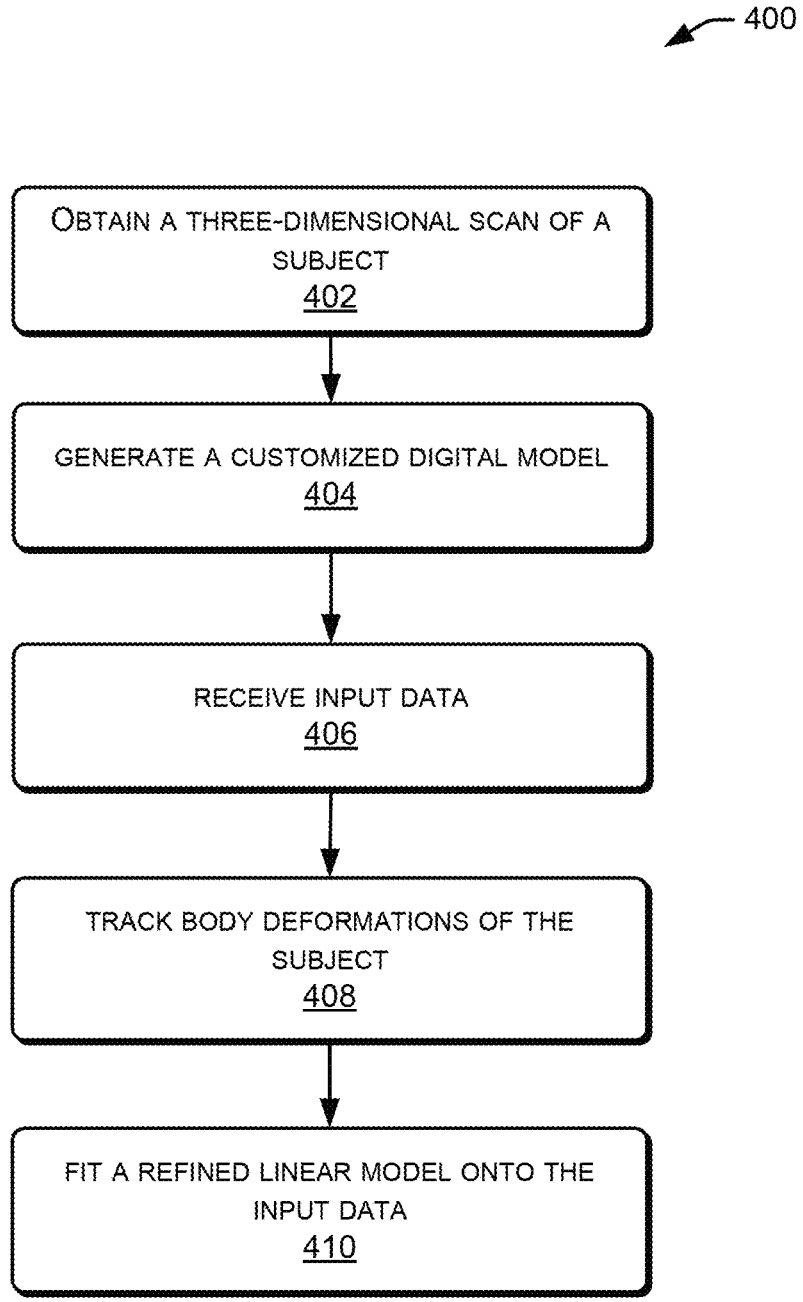
FIG. 4 illustrates an example of a process for real-time facial performance capture.

FIG. 4 illustrates an exemplary process 400 for real-time facial performance capture. Process 400 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 400 may be performed under the control of one or more computer systems (e.g., computer system 1300) configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

Process 400 may begin at 402 by obtaining a three-dimensional scan of a subject. In some embodiments, the three-dimensional scan of the subject may include a scan of the subject's face. In some embodiments, the scan may include a scan of the subject or the subject's face in a neutral pose or position. The three-dimensional scan of the subject may be obtained by performing the steps 202-206 of process 200. For example, input data of the subject may captured using, for example, the input sensor 104 of FIG. 1. The input data may then be aggregated. For example, multiple input depth map frames may be aggregated using volumetric scan integration and a rigid alignment that is based on a fast iterative closest point (ICP) method. An integrated scan may then be generated as a result of the aggregation of the input data.

At 404, the process 400 generates a customized digital model including a set of blendshapes using the three-dimensional scan, each of one or more blendshapes of the set of blendshapes representing at least a portion of a characteristic of the subject. In some embodiments, characteristics of the subject include one or more of a position of a mouth, an eye, an eyebrow, a nose, or a cheek, or the like. Generation of the customized digital model and the set of blendshapes may be conducted in accordance with the techniques described above with reference to FIG. 2. For example, the customized digital model may include the approximate 3D tracking model. As described above with respect to FIG. 2, a morphable face model may be fit or warped onto the integrated scan of the subject in order to produce a 3D model in a neutral expression. A set of generic blendshapes and the 3D model in the neutral expression may be used in a deformation transfer algorithm to generate the set of initial blendshapes that make up the customized digital model. For example, the deformation transfer may apply the deformation exhibited by each of the generic blendshapes onto the 3D model in the neutral expression.

At 406, the process 400 receives input data. The input data may include video data and depth data of the subject. For example, as described above with respect to FIG. 3, the video data may include 2D facial feature constraints and the depth data may include one or more depth maps.

At 408, the process 400 tracks body deformations of the subject by fitting the input data using one or more of the blendshapes of the set. For example, the subject may make different facial expressions, which may be tracked for providing an output animation that accurately mimics the expressions. In some embodiments, tracking the body deformations of the subject may be performed in real-time or substantial real-time. For example, the input data may be fit with one or more of the blendshapes as the subject is performing a facial expression. As described above with respect to FIG. 3, rigid motion tracking may be performed in order to rigidly align the tracked 3D model of the previous frame to the current input frame (if there are no previous frames, the initial input may be the approximate 3D tracking model in a neutral expression). The rigid motion tracking may include solving for a global rigid transformation using a fast rigid ICP technique. As a result, the rigid motion tracking produces a rigid transformation of approximately where the face is positioned. Further, the expression that the subject is currently performing may be determined and an appropriate initial blendshape may be applied. An initial blendshape fit may be performed for each input frame using 3D point constraints on the input scans (the 3D depth map data) and 2D facial features constraints (the video data).

At 410, the process 400 fits a refined linear model onto the input data using one or more adaptive principal component analysis shapes. In some embodiments, the adaptive principal component analysis shapes include one or more anchor shapes and one or more corrective shapes. In some embodiments, the one or more corrective shapes are iteratively updated. For example, as described above with respect to FIG. 3, a blendshape model resulting from step 410 may be refined by warping the blendshape model to a linear subspace (e.g., an adaptive PCA space, or the like) using a progressively updated adaptive model 316 (e.g., an adaptive PCA model). This is beneficial because the initial blendshapes 304 are personalized but crude approximations of various real expressions of the subject. In order to create personalized expressions, the blendshape model is fit to a linear adaptive PCA subspace in order to extend the space that is spanned by the initial blendshapes. Accordingly, the linear PCA space more accurately describes the actual expression of the subject.

Step 410 may be divided into a deformation stage and a subspace projection stage, as described above with respect to FIG. 3. The deformation stage includes refining the mesh obtained in the prior step using a deformation technique with the same 3D point constraints (the one or more depth maps) and 2D facial feature constraints (video data) on the input scans that were used in the prior step. The initial blendshape that is chosen is deformed onto the current frame using the mesh deformation technique so that the resulting model matches the details of the subject's expression in that frame more accurately than the initial blendshape. Various mesh deformation techniques may be used, such as a Laplacian deformation, an as-rigid-as-possible deformation, a gradiant space deformation, a bending-stretching-minimization deformation, a Poisson deformation (if right hand side is not zero), or the like. The deformation stage is followed by the subspace projection stage, in which the deformed mesh is projected onto a continuously improving linear adaptive PCA model in a linear adaptive PCA subspace. As described above, the deformed mesh is projected onto a linear subspace so that the mesh is made linear, which allows it to be used as an input to continuously train the linear adaptive PCA tracking model.

Figure 5:
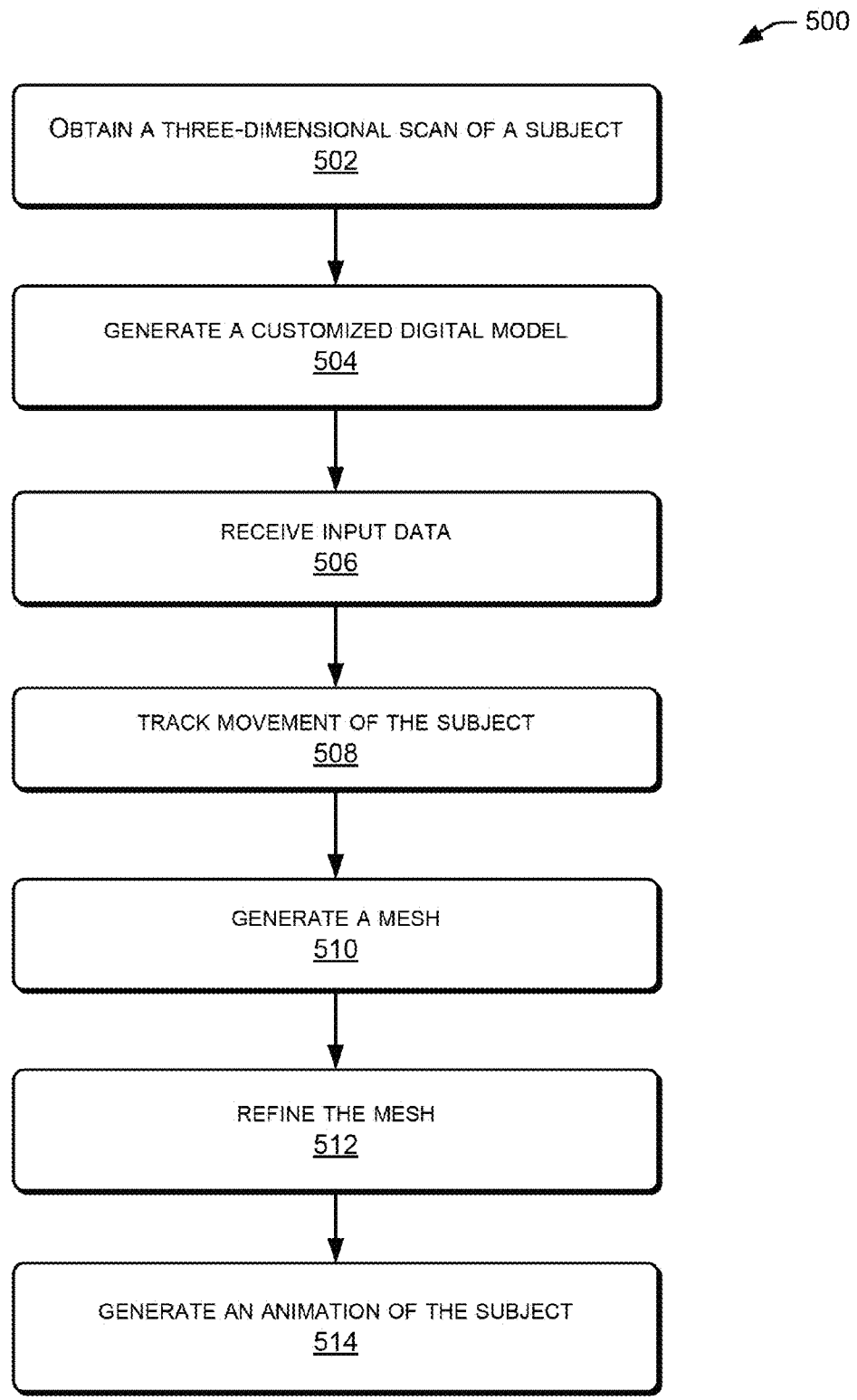
FIG. 5 illustrates another example of a process for real-time facial performance capture.

As a result of fitting the blendshape model to the linear adaptive PCA subspace, personalized expressions may be obtained for the subject. Significant improvements are achieved using the adaptive PCA space fitting compared to using only initial blendshape FIG. 5 illustrates an exemplary process 500 for real-time facial performance capture. Process 500 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 500 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

Process 500 may begin at 502 by obtaining a three-dimensional scan of a subject. In some embodiments, the three-dimensional scan of the subject may include a scan of the subject's face. In some embodiments, the scan may include a scan of the subject or the subject's face in a neutral pose or position. The three-dimensional scan of the subject may be obtained by performing the steps 202-206 of process 200. For example, input data of the subject may captured using, for example, the input sensor 104 of FIG. 1. The input data may then be aggregated. For example, multiple input depth map frames may be aggregated using volumetric scan integration and a rigid alignment that is based on a fast iterative closest point (ICP) method. An integrated scan may then be generated as a result of the aggregation of the input data.

At 504, the process 500 generates a customized digital model including a set of blendshapes using the three-dimensional scan, each of one or more blendshapes of the set of blendshapes representing at least a portion of a characteristic of the subject. In some embodiments, characteristics of the subject include one or more of a position of a mouth, an eye, an eyebrow, a nose, or a cheek, or the like. Generation of the customized digital model and the set of blendshapes may be conducted in accordance with the techniques described above with reference to FIG. 2. For example, the customized digital model may include the approximate 3D tracking model. A morphable face model may be fit or warped onto the integrated scan of the subject in order to produce a 3D model in a neutral expression, as described above with respect to FIG. 2. A set of generic blendshapes and the 3D model in the neutral expression may be used in a deformation transfer algorithm to generate the set of initial blendshapes that make up the customized digital model. For example, the deformation transfer may apply the deformation exhibited by each of the generic blendshapes onto the 3D model in the neutral expression.

At 506, the process 500 receives receiving input data. The input data may include video data and depth data of the subject. For example, as described above with respect to FIG. 3, the video data may include 2D facial feature constraints and the depth data may include one or more depth maps. In some embodiments, the video data of the received input data includes markerless video data of the subject performing an act that involves body deformation, the video data including a sequence of frames recorded without using physical markers applied to the subject that are designed for motion capture. As a result, the subject does not have to be burdened with using markers in order to be tracked. In some embodiments, the body deformation includes deformation of at least part of a face of the subject.

At 508, the process 500 tracks movement of the subject by aligning a model of a prior frame of the input data to a current frame of the input data. In some embodiments, tracking movement of the subject may be performed in real-time or substantial real-time. For example, the model of the prior frame may be aligned with a current frame as the subject is performing a facial expression. As described above with respect to FIG. 3, rigid motion tracking may be performed in order to rigidly align the tracked 3D model of the previous frame to the current input frame (if there are no previous frames, the initial input may be the approximate 3D tracking model in a neutral expression). The rigid motion tracking may include solving for a global rigid transformation using a fast rigid ICP technique. As a result, the rigid motion tracking produces a rigid transformation of approximately where the face is positioned.

At 510, the process 500 generates a mesh by aligning one or more of the blendshapes of the set to the input data, wherein the mesh represents at least a part of the subject. The expression that the subject is currently performing may be determined and an appropriate initial blendshape may be applied using the techniques described above with respect to FIG. 3. For example, an initial blendshape fit may be performed for each input frame using 3D point constraints on the input scans (the 3D depth map data) and 2D facial features constraints (the video data).

At 512, the process 500 includes refining the mesh by applying a deformation to the mesh and projecting the deformed mesh to a linear subspace. For example, a deformation stage and a subspace projection stage may be performed, as described above with respect to FIG. 3. The deformation stage includes refining the mesh obtained in the prior step using a deformation technique with the same 3D point constraints (the one or more depth maps) and 2D facial feature constraints (video data) on the input scans that were used in the prior step. In some embodiments, the deformation includes a mesh deformation. The initial blendshape that is chosen is deformed onto the current frame using the mesh deformation technique so that the resulting model matches the details of the subject's expression in that frame more accurately than the initial blendshape. Various mesh deformation techniques may be used, such as a Laplacian deformation, an as-rigid-as-possible deformation, a gradiant space deformation, a bending-stretching-minimization deformation, a Poisson deformation (if right hand side is not zero), or the like. The deformation stage is followed by the subspace projection stage, where the deformed mesh is projected onto a continuously improving linear adaptive PCA model in a linear adaptive PCA subspace. The deformed mesh is projected onto a linear subspace so that the mesh is made linear, which allows it to be used as an input to continuously train the linear adaptive PCA tracking model.

At 512, the process 500 includes generating an animation of the subject using the refined mesh. In some embodiments, the process 500 further includes applying the refined mesh to an animation of a target character. For example, as described above with respect to FIG. 3, output animation may include using blendshape coefficients for expression retargeting to a character. More expressive retargeting may be obtained by re-solving for blendshape coefficients using resulting final output mesh vertices, as compared to using only initial blendshape coefficients. A mapping back to the blendshape space may be performed since the adaptive tracking model lies in the PCA space. In some embodiments, an example-based facial rigging may be used to map to the blendshape space. The extracted blendshape coefficients from the vertices of the adaptive model may then be transferred to a compatible blendshape model of a target character for retargeting.

In some embodiments, the process 500 includes further refining the refined mesh by applying a second deformation to the refined mesh. In some embodiments, the linear subspace includes a principal component analysis space. In some embodiments, the principal component analysis space includes one or more anchor shapes and one or more corrective shapes. In some embodiments, the one or more corrective shapes adjust on-the-fly to one or more expressions of the subject using incremental principal component analysis based learning. For example, as described above with respect to FIG. 3, an out-of-adaptive space deformation may be implemented prior to generating the animation of the subject at 512. Two additional warping steps may be used to generate out-of-adaptive-space deformations, including a first step to feed an incremental PCA process with reliable data and a second step to generate the final output mesh.

The out-of-adaptive-space deformations for feeding the incremental PCA process may be used to build the linear adaptive PCA space. As explained above, the linear adaptive PCA space extends the space that is spanned by the initial blendshapes with PCA modes in order to create personalized expressions. The PCA space may be continuously trained or built using the out-of-adaptive space deformation as the subject is being tracked. The out-of-adaptive-space deformations for feeding the incremental PCA process includes training the one or more corrective shapes of the adaptive PCA model in the adaptive PCA space. For example, the one or more anchor shapes may be initialized with a number of orthonormalized vectors from the initial blendshapes, and the one or more corrective shapes may be learned to improve the fitting accuracy over time. New expression samples of the subject may first be collected that fall outside of the currently used adaptive PCA space in order to train the correctives. The samples are used to refine the one or more corrective shapes using the incremental PCA technique. In some embodiments, an expectation-maximization (EM) algorithm may be used as an incremental PCA learning approach.

The out-of-adaptive-space deformation may also be used to generate the final output mesh. In some embodiments, only 2D facial features may be used as constraints for the tracking output since the depth maps may be noisy. For example, as described above with respect to FIG. 3, the adaptive PCA model may be refined by applying an additional Laplacian deformation with only the 2D facial features as constraints to obtain a final output mesh $v^4$. The final output mesh may then be provided as the tracking model that is output for the output animation.

In some embodiments, no training phase including obtaining a set of pre-processed facial expressions of the subject is required to generate the animation of the subject, as only a neutral expression is required to perform the performance capture techniques described herein.

The above described techniques may provide various results. For example, FIG. 6 shows the influence of each stage of the real-time facial animation tracking process 300 and compares the result of the tracking process 300 to that obtained with individual steps omitted. The input 602 to the process 300 includes depth data (one or more depth maps) and 2D features (from video texture data). The model 604 results from using only the initial blendshapes. All stages of process 300 capture more details of the subject's expressions than the pure blendshape fit. The model 606 illustrates the benefit of using an initial blendshape fit to improve the optimization of the adaptive PCA fitting stage. Comparison of the model 608 with the model 610 illustrates the advantage of using the mesh deformation (e.g., Laplacian deformation). For example, when the Laplacian deformation is left out during the fitting in adaptive space step 310, the 2D facial feature constraints become less effective. As illustrated by the model 612, the final out-of-adaptive space deformation can produce expressions that are not yet trained in the adaptive PCA model.

Figure 7:
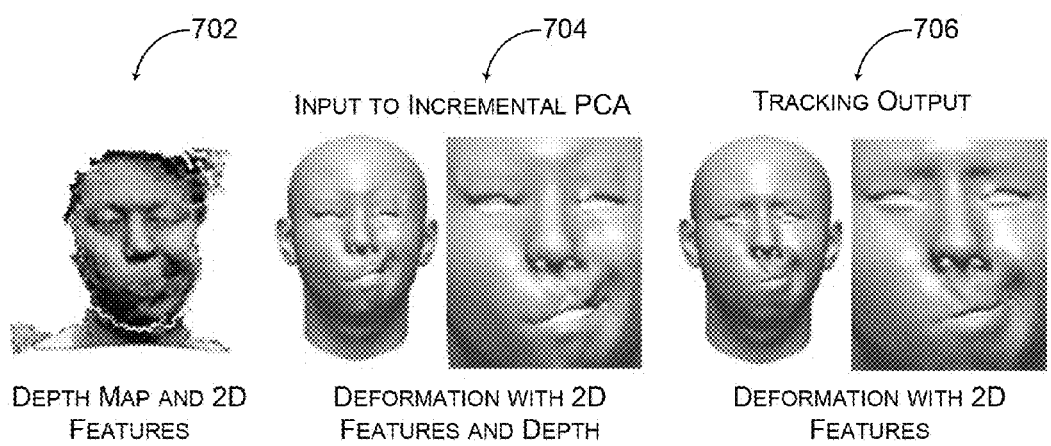
FIG. 7 shows an out-of-adaptive-space deformation for tracking output and for input to incremental principal component analysis (PCA).

FIG. 7 shows the two versions of the out-of-adaptive space deformation, including an out-of-adaptive-space deformation 706 for the tracking output and an out-of-adaptive-space deformation 704 for input to the incremental PCA process. The deformation 706 for the tracking output uses only 2D feature constraints and contains less high-frequency noise than the deformation output to the incremental PCA. The deformation 704 for input to the incremental PCA process uses 3D depth constraints in addition to the 2D facial features constraints in order to provide training samples to the incremental PCA process.

FIG. 8 illustrates two examples of the evolution of the correctives 320 during each incremental update, showing the effect of the correctives 320 during the tracking process 300 with a continuously updated adaptive PCA model 316. For example, when the subject performs a new expression that could not be captured by the current adaptive PCA model for the previous frame, a large error may be measured between the adaptive PCA fit and the final tracking. As shown by the heat maps in FIG. 8, the error decreases rapidly as new training samples are provided to the incremental PCA algorithm and new expressions are learned. The heat maps show the difference between the final tracking and the adaptive PCA model. Further, a higher number of anchor shapes improves the fitting accuracy since a more faithful shape prior is used.

FIG. 9 shows the results of transferring blendshape coefficients for retargeting using the coefficients of the final output mesh $v^4$ obtained from the out-of-adaptive space deformation. As illustrated by the models 902, the initial blendshape coefficients 304 may be used for expression retargeting. However, as illustrated by model 904, more expressive retargeting may be obtained by re-solving for blendshape coefficients using the final output mesh vertices of $v^4$.

Figure 10:
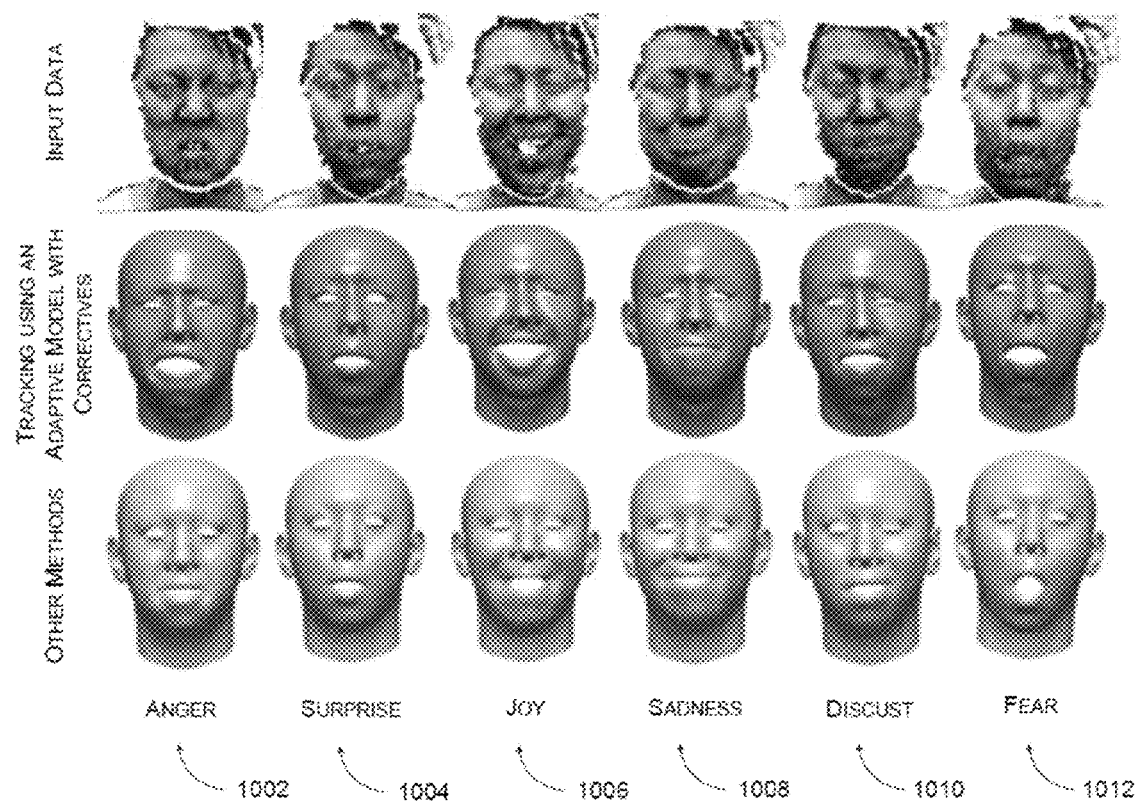
FIG. 10 shows the effect of using an adaptive model to capture emotions.
Figure 11:
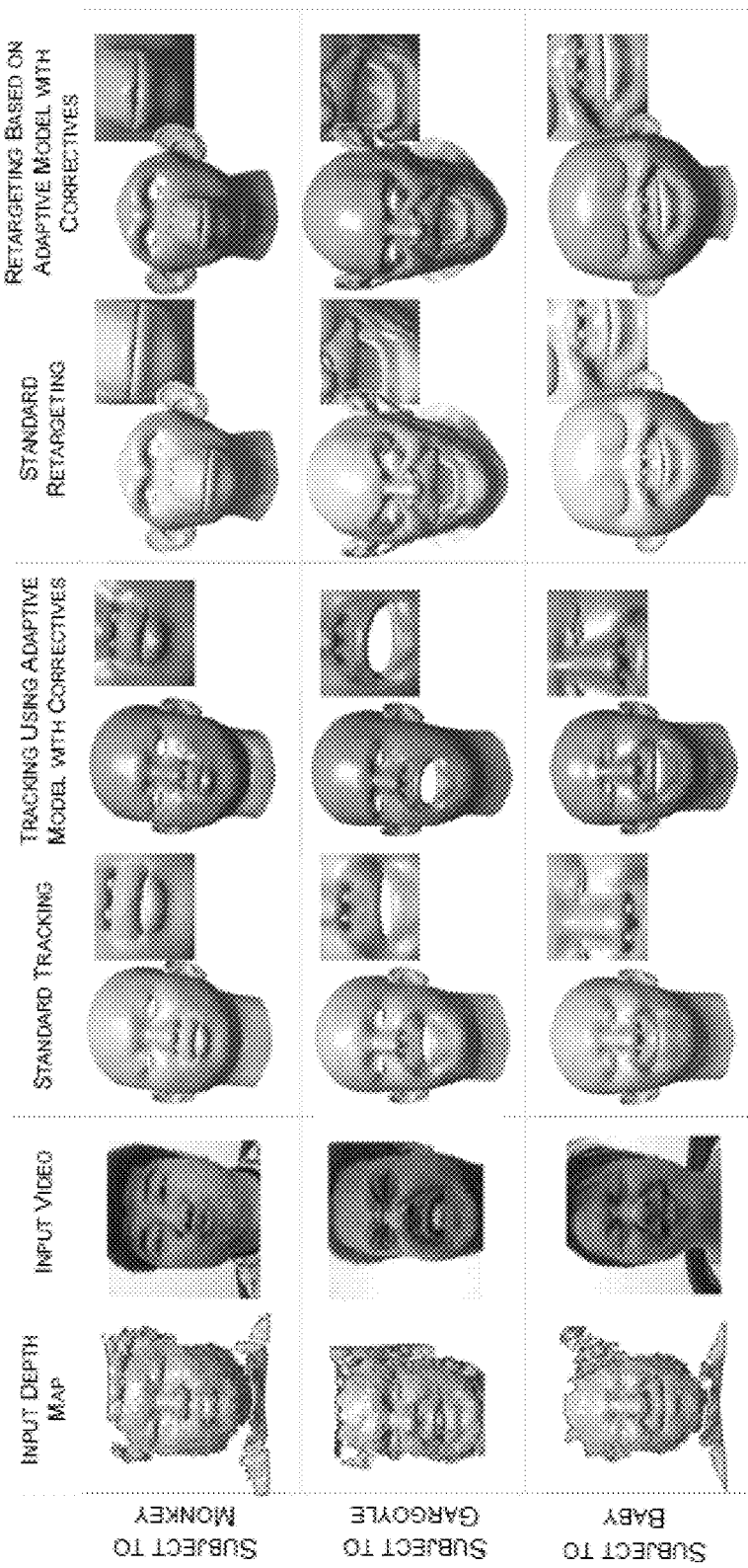
FIG. 11 shows additional results and comparisons of real-time facial animation techniques according to various embodiments of the present invention.

FIGS. 10 and 11 illustrate how the facial performance capture techniques described herein using an adaptive tracking model 316 with corrective shapes 320 conforms to subject input expressions on-the-fly. FIG. 10 compares the techniques described herein with less-effective methods using six basic human emotional expressions and shows that the adaptive tracking model 316 can be used to accurately capture these characteristics. As can be seen by the various models 1002-1012 illustrating the different human expressions, the facial performance capture processes described herein produce a better fit to the subject than traditional data driven techniques, which are typically confined to learned motion or expressions received prior to tracking. The adaptive model 316 accurately captures emotions more effectively than other methods without requiring a training session. FIG. 11 compares standard tracking and retargeting with tracking and retargeting that is based on the adaptive model 316 with correctives 320. It can be see that the adaptive model 316 leads to more accurate expressions being tracked and retargeted to the various characters.

Figure 12:
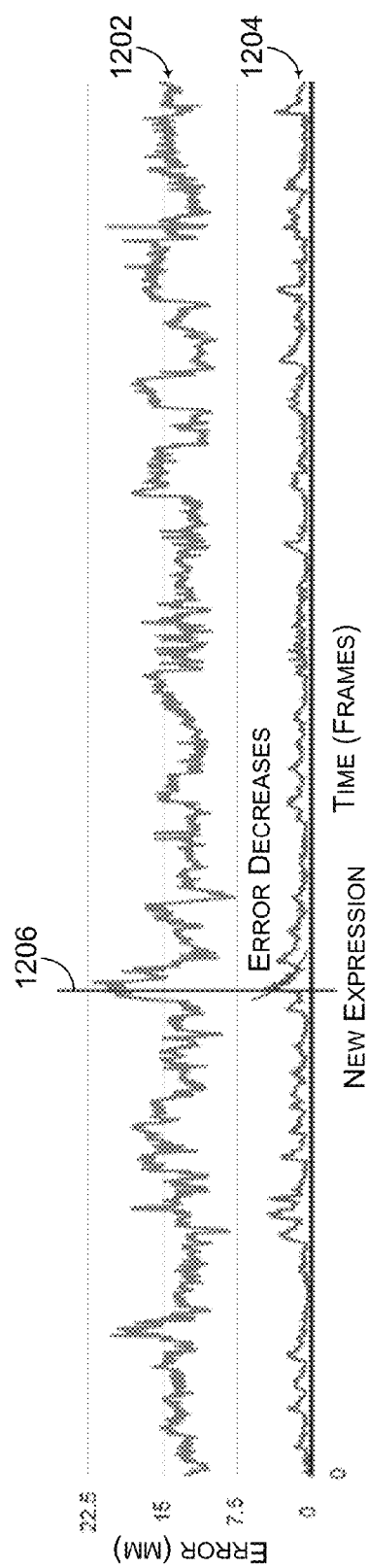
FIG. 12 shows a graph illustrating the fast convergence of incremental PCA techniques according to various embodiments of the present invention.

FIG. 12 graphically illustrates the fast convergence of the incremental PCA process 314 by showing the error as time progresses. As described above, the final facial tracking output includes the vertices of the mesh $v^4$ that result from the out-of-adaptive space deformation 312. The error shown by line 1202 includes the average distance between these vertices and the anchor shape space $M_A$, while the error shown by the line 1204 includes the full adaptive PCA space M. The tracking is shown to be more accurate with the adaptive tracking model 316 than using only the initial blendshapes. As shown by the marker 1206, the error drops rapidly whenever a new expression occurs. It can be observed that very few updates are necessary to produce a good fit between the adaptive PCA model and the input scans.

The real-time facial tracking using an adaptive PCA model can adapt to a wide variety of actors and produce retargeting results that match the real performance more accurately than previous methods (see FIG. 11). The adaptive PCA model learns all the fine-scale details after only a few updates, faithfully capturing and reproducing emotional actor-specific expressions and subtle lip movements. The techniques described herein do not require any training except for a single neutral face scan, whereas the example-based facial training of traditional methods requires several input examples to build a reasonable blendshape for tracking Because the techniques described herein allow a subject, such as an actor, to use the system instantly once a neutral face pose has been captured, the processes may have immediate positive effects on users. For example, the adaptive model techniques can be applied to general consumer applications, such as virtual avatars in communication or performance driven gaming experiences. The adaptive model techniques can also allow the capture of non-cooperating subjects that refuse to comply with any prior training procedures, such as babies, patients with movement disorders, or rapidly changing users in public places, such as venues with kiosks, amusement parks, and/or other venues.

While the techniques described above obtain a single scan of the actor as input, embodiments may include estimating the actor's neutral shape together with other expressions. Automatically identifying the expressions of the actor without the need of a reference neutral expression shape may thus be achieved.

Figure 13:
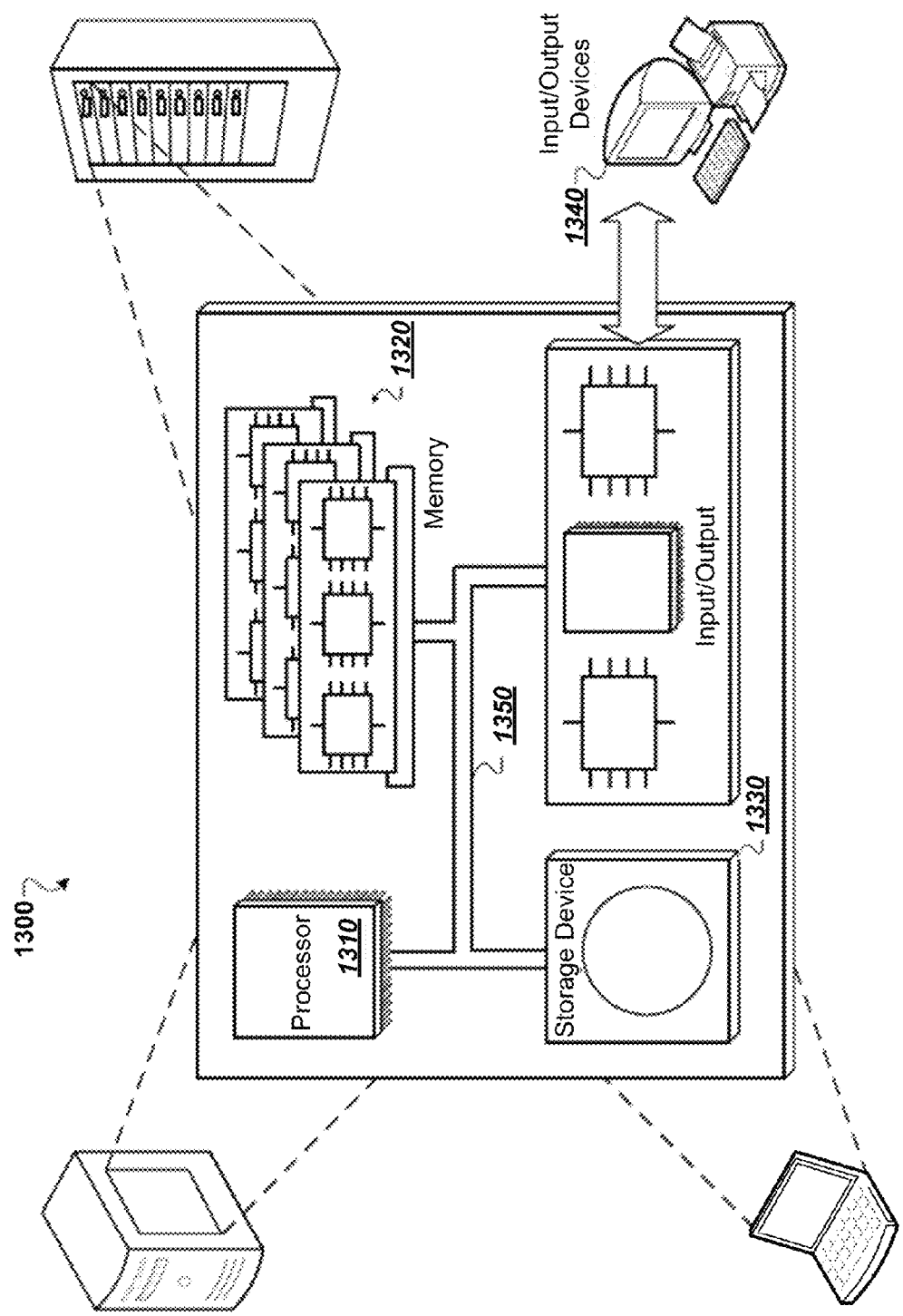
FIG. 13 shows an example of a computer system that may be used in various embodiments of the present invention.

Referring to FIG. 13, a schematic diagram is shown of an example of a computer system 1300. The computer system 1300 is exemplary only and one having skill in the art will recognize that variations and modifications are possible. The system 1300 can be used for the operations described in association with the processes 200-500 of FIGS. 2-5, as well as any of the components shown in FIG. 1. For example, the components shown in FIG. 13 may be used at part of the computer 102 or the input sensor 104.

The system 1300 includes a processor 1310, a memory 1320, a storage device 1330, and an input/output device 1340. Each of the components 1310, 1320, 1330, and 1340 are interconnected using a system bus 1350. The processor 1310 is capable of processing instructions for execution within the system 1300. In one implementation, the processor 1310 is a single-threaded processor. In another implementation, the processor 1310 is a multi-threaded processor. The processor 1310 is capable of processing instructions stored in the memory 1320 or on the storage device 1330 to perform the steps of processes 200-500.

The memory 1320 stores information within the system 1300 and may be associated with various characteristics and implementations. For example, the memory 1320 may include various types of computer-readable medium such as volatile memory, a non-volatile memory and other types of memory technology, individually or in combination.

The storage device 1330 is capable of providing mass storage for the system 1300. In one implementation, the storage device 1330 is a computer-readable medium. In various different implementations, the storage device 1330 may be a floppy disk device, a hard disk device, an optical disk device, or a tape device.

The input/output device 1340 provides input/output operations for the system 1300. In one implementation, the input/output device 1340 includes a keyboard, pointing device, touchscreen display, and/or the like. In another implementation, the input/output device 1340 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display), LED (light emitting diode) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system 1300 can include clients and servers. A client and server are generally remote from each other and typically interact through a network, such as the described one. The relationship of client and server arises by virtue of computer programs running on the respective computers and having a client-server relationship to each other. Although a few implementations have been described in detail above, other modifications are possible.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of embodiments of the invention have been described. Nevertheless, it will be understood that various modification may be made without departing from the scope of the invention. Accordingly, other embodiments are within the scope of the following claims.

What is claimed is:

1. A computer-implemented method comprising:
   obtaining a three-dimensional scan of a subject;
   generating a customized digital model including a set of blendshapes using the three-dimensional scan, each of one or more blendshapes of the set of blendshapes representing at least a portion of a characteristic of the subject;
   receiving input data of the subject, the input data including video data and depth data;
   tracking body deformations of the subject by fitting the input data using one or more of the blendshapes of the set;
   generating a refined linear model including one or more adaptive principal component analysis shapes, the refined linear model being generated by deforming the set of blendshapes onto the input data to obtain a deformed mesh and projecting the deformed mesh to a linear adaptive principal component analysis subspace; and
   fitting the refined linear model onto the input data using the one or more adaptive principal component analysis shapes.

2. The computer-implemented method of claim 1, wherein the three-dimensional scan of the subject includes the subject in a neutral position.

3. The computer-implemented method of claim 1, wherein the video data of the received input data includes markerless video data of the subject performing an act that involves body deformation, the markerless video data including a sequence of frames recorded without using physical markers applied to the subject that are designed for motion capture.

4. The computer-implemented method of claim 1, wherein the body deformations include deformation of at least part of a face of the subject.

5. The computer-implemented method of claim 1, wherein no training phase including obtaining a set of pre-processed facial expressions of the subject is required to generate an animation of the subject.

6. The computer-implemented method of claim 1, wherein the one or more adaptive principal component analysis shapes include one or more anchor shapes and one or more corrective shapes, the one or more anchor shapes being obtained by performing a principal component analysis on the set of blendshapes, and the one or more corrective shapes being based on additional shapes not present in the set of blendshapes.

7. The computer-implemented method of claim 6, wherein the one or more corrective shapes are iteratively updated by determining new shapes that are outside of the one or more adaptive principal component analysis shapes, and modifying the one or more adaptive principal component analysis shapes based on the determined new shapes.

8. A system, comprising:
   a memory storing a plurality of instructions; and
   one or more processors configurable to:
      obtain a three-dimensional scan of a subject;
      generate a customized digital model including a set of blendshapes using the three-dimensional scan, each of one or more blendshapes of the set of blendshapes representing at least a portion of a characteristic of the subject;
      receive input data of the subject, the input data including video data and depth data;
      track body deformations of the subject by fitting the input data using one or more of the blendshapes of the set;
      generate a refined linear model including one or more adaptive principal component analysis shapes, the refined linear model being generated by deforming the set of blendshapes onto the input data to obtain a deformed mesh and projecting the deformed mesh to a linear adaptive principal component analysis subspace; and
      fit the refined linear model onto the input data using the one or more adaptive principal component analysis shapes.

9. The system of claim 8, wherein the three-dimensional scan of the subject includes the subject in a neutral position.

10. The system of claim 8, wherein the video data of the received input data includes markerless video data of the subject performing an act that involves body deformation, the markerless video data including a sequence of frames recorded without using physical markers applied to the subject that are designed for motion capture.

11. The system of claim 8, wherein the body deformations include deformation of at least part of a face of the subject.

12. The system of claim 8, wherein no training phase including obtaining a set of pre-processed facial expressions of the subject is required to generate an animation of the subject.

13. The system of claim 8, wherein the one or more adaptive principal component analysis shapes include one or more anchor shapes and one or more corrective shapes, the one or more anchor shapes being obtained by performing a principal component analysis on the set of blendshapes, and the one or more corrective shapes being based on additional shapes not present in the set of blendshapes.

14. The system of claim 13, wherein the one or more corrective shapes are iteratively updated by determining new shapes that are outside of the one or more adaptive principal component analysis shapes, and modifying the one or more adaptive principal component analysis shapes based on the determined new shapes.

15. A non-transitory computer-readable memory storing a plurality of instructions executable by one or more processors, the plurality of instructions comprising:
    instructions that cause the one or more processors to obtain a three-dimensional scan of a subject;
    instructions that cause the one or more processors to generate a customized digital model including a set of blendshapes using the three-dimensional scan, each of one or more blendshapes of the set of blendshapes representing at least a portion of a characteristic of the subject;
    instructions that cause the one or more processors to receive input data of the subject, the input data including video data and depth data;
    instructions that cause the one or more processors to track body deformations of the subject by fitting the input data using one or more of the blendshapes of the set;
    instructions that cause the one or more processors to generate a refined linear model including one or more adaptive principal component analysis shapes, the refined linear model being generated by deforming the set of blendshapes onto the input data to obtain a deformed mesh and projecting the deformed mesh to a linear adaptive principal component analysis subspace; and
    instructions that cause the one or more processors to fit the refined linear model onto the input data using the one or more adaptive principal component analysis shapes.

16. The non-transitory computer-readable memory of claim 15, wherein the three-dimensional scan of the subject includes the subject in a neutral position.

17. The non-transitory computer-readable memory of claim 15, wherein the video data of the received input data includes markerless video data of the subject performing an act that involves body deformation, the markerless video data including a sequence of frames recorded without using physical markers applied to the subject that are designed for motion capture.

18. The non-transitory computer-readable memory of claim 15, wherein no training phase including obtaining a set of pre-processed facial expressions of the subject is required to generate an animation of the subject.

19. The non-transitory computer-readable memory of claim 15, wherein the one or more adaptive principal component analysis shapes include one or more anchor shapes and one or more corrective shapes, the one or more anchor shapes being obtained by performing a principal component analysis on the set of blendshapes, and the one or more corrective shapes being based on additional shapes not present in the set of blendshapes.

20. The non-transitory computer-readable memory of claim 19, wherein the one or more corrective shapes are iteratively updated by determining new shapes that are outside of the one or more adaptive principal component analysis shapes, and modifying the one or more adaptive principal component analysis shapes based on the determined new shapes.

* * * * *